United States Patent
Lorenz et al.

(10) Patent No.: US 10,753,254 B2
(45) Date of Patent: Aug. 25, 2020

(54) REDUCTANT INSERTION ASSEMBLIES INCLUDING MULTIPLE METERING ASSEMBLIES AND A SINGLE PUMP

(71) Applicant: Cummins Emission Solutions Inc., Columbus, IN (US)

(72) Inventors: Tyler Kent Lorenz, McFarland, WI (US); Colin L. Norris, Columbus, IN (US); Taren DeHart, Columbus, IN (US); Tony L. Bowden, Seymour, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 15/913,376

(22) Filed: Mar. 6, 2018

(65) Prior Publication Data
US 2019/0277175 A1 Sep. 12, 2019

(51) Int. Cl.
*F01N 3/20* (2006.01)
(52) U.S. Cl.
CPC .......... *F01N 3/208* (2013.01); *F01N 2610/02* (2013.01); *F01N 2900/1808* (2013.01); *F01N 2900/1822* (2013.01)
(58) Field of Classification Search
CPC .............. B01D 53/90; B01D 53/9477; B01D 2251/2067; B01D 2251/208; F01N 3/025; F01N 3/035; F01N 3/103; F01N 3/2066; F01N 2610/02; F01N 2610/03; F01N 2610/14; F01N 2610/1406; F01N 2610/1433
See application file for complete search history.

(56) References Cited

U.S. PATENT DOCUMENTS

| | | | | |
|---|---|---|---|---|
| 6,125,629 | A * | 10/2000 | Patchett | B01D 53/9431 60/286 |
| 7,040,290 | B2 * | 5/2006 | Kim | F02D 41/3836 123/456 |
| 2008/0115770 | A1 * | 5/2008 | Merchant | F02M 59/102 123/508 |
| 2010/0082224 | A1 * | 4/2010 | Stretch | F02D 33/003 701/103 |
| 2010/0139260 | A1 * | 6/2010 | Rodman | B01F 3/04049 60/303 |
| 2012/0073264 | A1 * | 3/2012 | Li | F01N 3/208 60/274 |
| 2013/0343959 | A1 * | 12/2013 | Golin | F01N 3/103 422/170 |
| 2014/0241948 | A1 * | 8/2014 | Cole | B01D 53/92 422/111 |

* cited by examiner

*Primary Examiner* — Jason D Shanske
*Assistant Examiner* — Matthew T Largi
(74) *Attorney, Agent, or Firm* — Foley & Lardner LLP

(57) ABSTRACT

A reductant insertion assembly for inserting a reductant into an aftertreatment system comprises a pump assembly including a pump. A first metering assembly is fluidly coupled to the pump. A second metering assembly is fluidly coupled to first metering assembly in series with the pump. The pump is configured to pump the reductant to the first metering assembly, and to the second metering assembly via the first metering assembly, such that a first reductant pressure in the first metering assembly is equal to a second reductant pressure in the second metering assembly.

19 Claims, 17 Drawing Sheets

REDUCTANT INSERTION ASSEMBLIES INCLUDING MULTIPLE METERING ASSEMBLIES AND A SINGLE PUMP

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems include any of several different components to reduce the levels of harmful exhaust emissions present in the exhaust gas. For example, certain exhaust gas aftertreatment systems for diesel-powered IC engines include a selective catalytic reduction (SCR) system including a catalyst formulated to convert NOx (NO and $NO_2$ in some fraction) into harmless nitrogen gas ($N_2$) and water vapor ($H_2O$) in the presence of ammonia ($NH_3$). Generally in such aftertreatment systems, an exhaust reductant, (e.g., a diesel exhaust fluid such as urea) is injected into the SCR system to provide a source of ammonia, and mixed with the exhaust gas to partially reduce the NOx gases. The reduction byproducts of the exhaust gas are then fluidically communicated to the catalyst included in the SCR system to decompose substantially all of the NOx gases into relatively harmless byproducts which are expelled out of the aftertreatment system.

An exhaust reductant is generally inserted into the SCR system as the source of ammonia to facilitate the reduction of constituents such as NOx gases of the exhaust gas (e.g., a diesel exhaust gas) by the catalyst included in the SCR system. Reductant insertion assemblies which can include pumps, valves, fluid communication lines, orifices, nozzles, pressure relief valve, bypass valves and/or other fluid communication equipment are often used for controlled insertion of the reductant into the aftertreatment system, for example the SCR system of the aftertreatment system.

Some aftertreatment systems are fluidly coupled to large engines, for example high horse power (HHP) engines which generate a large amount of exhaust gas. Such aftertreatment systems often need a large amount of reductant to efficiently reduce the constituents of the exhaust gas produced by the large engines. To meet the high reductant demand, the reductant may be inserted at a plurality of locations in the aftertreatment system, for example via a plurality of injectors positioned at various locations on or upstream of an SCR system included in the aftertreatment system. Conventional reductant insertion assemblies used to provide the reductant to such aftertreatment systems generally include a plurality of pumps, each of which is dedicated for providing reductant to a particular location or otherwise, an injector of the SCR system. This increases the manufacturing and maintenance cost, as well as the power requirement and amount of space occupied by such reductant insertion assemblies.

SUMMARY

Embodiments described herein relate generally to systems and methods for delivering a reductant to multiple locations of an aftertreatment system using a single pump, and in particular, to a reductant insertion assembly that includes a plurality of reductant metering assemblies fluidly coupled to a pump in series therewith, such that the pump communicates the reductant to each of the metering assemblies at the same pressure.

In a first set of embodiments, a reductant insertion assembly for inserting a reductant into an aftertreatment system comprises a pump assembly comprising a pump. A first metering assembly is fluidly coupled to the pump. A second metering assembly is fluidly coupled to first metering assembly in series with the pump. The pump is configured to pump the reductant to the first metering assembly, and to the second metering assembly via the first metering assembly, such that a first reductant pressure in the first metering assembly is equal to a second reductant pressure in the second metering assembly.

In another set of embodiments, an aftertreatment system configured to decompose constituents of an exhaust gas produced by an engine comprises a SCR system comprising a catalyst. A reductant insertion assembly is fluidly coupled to the SCR system. The reductant insertion assembly comprises a pump assembly comprising a pump. A first metering assembly is fluidly coupled to the pump and to the SCR system at a first location thereof. A second metering assembly is fluidly coupled to the first metering assembly in series with the pump, and to the SCR system at a second location thereof. The pump is configured to pump the reductant to the first metering assembly, and to the second metering assembly via the first metering assembly, such that a first reductant pressure in the first metering assembly is equal to a second reductant pressure in the second metering assembly.

In yet another set of embodiments, a method for inserting a reductant at a plurality of locations in an aftertreatment system comprises providing a reductant insertion assembly. The reductant insertion assembly comprises a pump assembly including a pump, a first metering assembly fluidly coupled to the pump, and a second metering assembly fluidly coupled to the first metering assembly in series with the pump. The pump is activated so as to pump the reductant to the first metering assembly, and to the second metering assembly via the first metering assembly, such that a first reductant pressure in the first metering assembly is equal to a second reductant pressure in the second metering assembly. A reductant outlet pressure downstream of the first metering assembly and the second metering assembly is determined. A pump operating parameter of the pump is adjusted based on the reductant outlet pressure.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
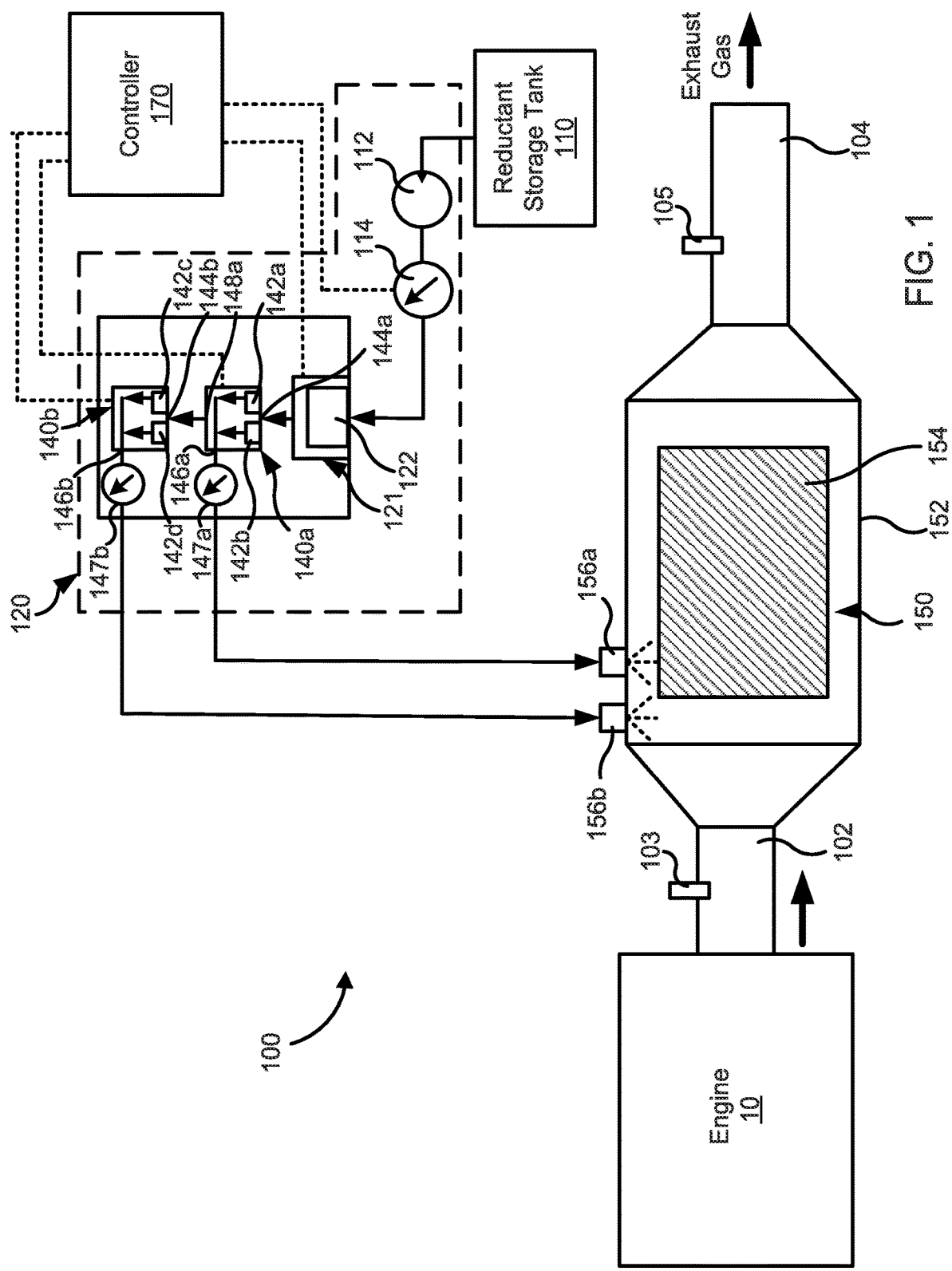
FIG. 1 is a schematic block diagram of an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for delivering a reductant to multiple locations of an aftertreatment system using a single pump, and in particular, to a reductant insertion assembly that includes a plurality of reductant metering assemblies fluidly coupled to a pump in series therewith, such that the pump communicates the reductant to each of the metering assemblies at the same pressure.

Some aftertreatment systems are fluidly coupled to large engines, for example HHP engines (e.g., having a capacity in the range of 19 liters to 120 liters or even higher) which generate a large amount of exhaust gas. Such aftertreatment systems often need a large amount of reductant to efficiently reduce the constituents of the exhaust gas produced by the large engine. To meet the high reductant demand, the reductant may be inserted at a plurality of locations in the aftertreatment system, for example via a plurality of insertion units (e.g., injectors) positioned at various locations on or upstream of an SCR system included in the aftertreatment system. For example, the aftertreatment system may include a plurality of SCR systems, and/or one or more decomposition chambers or tubes fluidly coupled to the one or more SCR systems and configured to deliver the exhaust gas thereto.

Conventional reductant insertion assemblies for providing the reductant to such aftertreatment systems generally include a plurality of pumps, each of which is dedicated for providing reductant to a particular location or otherwise, an injector of the SCR system. This increases the manufacturing and maintenance cost, as well as the power requirement and amount of space occupied by such reductant insertion assemblies.

Various embodiments of the systems and methods described herein for may provide benefits including, for example: (1) providing pressurized reductant at the same or substantially the same pressure to a plurality of metering valves using a single pump; (2) allowing modular installation of two or more metering valves in series with the pump, thereby providing design flexibility; (3) reducing operating and maintenance costs by using a single pump instead of a plurality of pumps; and (4) reducing power requirement and space claim.

FIG. 1 is a schematic illustration of an aftertreatment system 100, according to an embodiment. The aftertreatment system 100 is configured to receive an exhaust gas (e.g., a diesel exhaust gas) from an engine 10 and the reduce constituents of the exhaust gas such as, for example, NOx gases, CO, etc. The aftertreatment system 100 includes a reductant storage tank 110, a reductant insertion assembly 120, a SCR system 150 and a controller 170.

The engine 10 may include an IC engine, for example a diesel engine, a gasoline engine, a natural gas engine, a biodiesel engine, a dual fuel engine, an alcohol engine, an E85 or any other suitable internal combustion engine. The engine 10 may include a HHP engine, for example having a volumetric capacity in the range of 19 liters to 120 liters or even higher, and a rated power of greater than 500 HP.

The reductant storage tank 110 contains an exhaust reductant formulated to facilitate reduction of the constituents of the exhaust gas (e.g., NOx gases) by a catalyst 154 included in the SCR system 150. In embodiments in which the exhaust gas is a diesel exhaust gas, the exhaust reductant can include a diesel exhaust fluid (DEF) which provides a source of ammonia. Suitable DEFs can include urea, aqueous solution of urea or any other DEF (e.g., the DEF available under the tradename ADBLUE®). In particular embodiments, the reductant includes an aqueous urea solution containing 32.5% urea and 67.5% de-ionized water. In other embodiments, the reductant includes aqueous urea solution containing 40% urea and 60% de-ionized water, or may include any other concertation ratio of urea to deionized water.

The SCR system 150 is configured to receive and treat the exhaust gas (e.g., a diesel exhaust gas) flowing through the SCR system 150. The SCR system 150 is fluidly coupled to the reductant storage tank 110 so as to receive the reductant therefrom via the reductant insertion assembly 120, as described herein. The SCR system 150 includes a housing 152 defining an inlet 102 for receiving the exhaust gas from the engine 10, and an outlet 104 for expelling treated exhaust gas. While shown as including a single inlet 102, in various embodiments, the SCR system 150 may include a plurality of inlets for receiving exhaust gas from the engine 10 (e.g., from an exhaust manifold thereof). In other embodiments, the aftertreatment system 100 may include a plurality of SCR systems 150, each of the plurality of SCR systems 150 configured to receive and treat a portion of the exhaust gas produced by the engine 10. For example, each of the plurality of SCR systems 150 may be dedicated to receive and treat exhaust gas from a subset of a plurality of engine cylinders of the engine 10.

A first sensor 103 may be positioned in the inlet 102. The first sensor 103 may include, for example a NOx sensor (e.g., a physical or virtual NOx sensor), an oxygen sensor, a particulate matter sensor, a carbon monoxide sensor, a temperature sensor, a pressure sensor, any other sensor or a combination thereof configured to measure one or more parameters of the exhaust gas. Furthermore, a second sensor 105 may be positioned in the outlet 104. The second sensor 105 may include, for example a NOx sensor, a particulate matter sensor, an ammonia oxide (AMOx) sensor, an oxygen sensor, a temperature sensor, a pressure sensor, any other sensor or a combination thereof.

The SCR system 150 includes at least one catalyst 154 positioned within an internal volume defined by the housing 152. The catalyst 154 is formulated to selectively reduce constituents of the exhaust gas, for example NOx gases included in the exhaust gas in the presence of the reductant. Any suitable catalyst 154 can be used such as, for example, platinum, palladium, rhodium, cerium, iron, manganese, copper, vanadium based catalysts (including combinations thereof).

The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials can include, for example, aluminum oxide, titanium dioxide, silicon dioxide, any other suitable washcoat material, or a combination thereof. The exhaust gas can flow over and about the catalyst 154 such that NOx gases included in the exhaust gas are further reduced to yield an exhaust gas which is substantially free of carbon monoxide and NOx gases.

The aftertreatment system 100 also includes a first insertion unit 156a and a second insertion unit 156b. The first insertion unit 156a is positioned at a first location on the SCR system 150 and is configured to receive the reductant from the reductant insertion assembly 120 so as to insert the reductant at the first location. Furthermore, the second insertion unit 156b is positioned at a second location on the SCR system 150 different from the first location, and is configured to receive the reductant from the reductant insertion assembly 120 so as to insert the reductant at the second location. In some embodiments, the insertion units 156a/b may include, for example injectors or dosing lances. As shown in FIG. 1, the insertion units 156a/b are positioned on the housing 152 of the SCR system. In other embodiments, the inlet 102 may include a decomposition chamber or tube to allow the reductant to react with the exhaust gas. In such embodiments, the insertion units 156a/b maybe positioned on the inlet 102 so as to insert the reductant upstream of the SCR system 150. In other embodiments, the insertion units 156a/b may be positioned on respective inlet of a plurality of inlets coupled to the SCR system 150.

The reductant insertion assembly 120 is fluidly coupled to the reductant storage tank 110 and the SCR system 150 and is configured to insert the reductant into the SCR system 150 from the reductant storage tank 110. The reductant insertion assembly 120 includes a pump assembly 121, a first metering assembly 140a and a second metering assembly 140b. In some embodiments, an upstream pump 112 is positioned downstream of the reductant storage tank 110 and upstream of the pump assembly 121. The upstream pump 112 may include, for example a lift pump (e.g., a diaphragm pump or a piezoelectric pump) fluidly coupled to the reductant storage tank 110 and configured to pump the reductant from the reductant storage tank 110 to the pump assembly 121 at a predetermined upstream pressure and/or flow rate.

An upstream pressure sensor 114 may be positioned upstream of the pump assembly 121 and downstream of the upstream pump 112. The upstream pressure sensor 114 may be configured to determine a reductant pressure upstream of the pump assembly 121 and generate an upstream pressure signal indicative of the reductant pressure upstream of the pump assembly 121. The upstream pump 112 may be configured to adjust a pumping pressure thereof so as to provide the reductant to the pump assembly 121 at the predetermined upstream pressure and/or flow rate (e.g., a rated inlet pressure or flow rate of the pump assembly 121).

The pump assembly 121 comprises a pump 122 structured to receive the reductant from the reductant storage tank 110 and pressurize the reductant to an operating pressure of the pump 122. The pump 122 is configured to provide the reductant at the operating pressure to each of the metering assemblies 140a/b so as to allow the metering assemblies 140a/b to insert the reductant into the SCR system 150 at a predetermined pressure and/or flow rate, or otherwise provide the reductant to insertion units 156a/b for insertion into the SCR system 150 at the predetermined pressure and/or flow rate. In various embodiments, the operating pressure may be in the range of 0.5 bar to 10 bar (e.g., 0.5 bar, 1 bar, 2 bar, 4 bar, 6 bar, 8 bar or 10 bar inclusive of all ranges and values therebetween). The pump 122 may include any suitable pump, for example a centrifugal pump, a rotary pump, vacuum pump, a plate pump, a diaphragm or membrane pump or any other suitable pump. In particular embodiments, the pump 122 includes a fixed displacement gear pump. An rpm or pumping speed of the pump 122 included in the pump assembly 121 may be adjustable so as to allow the pump 122 to adjust the operating pressure of the reductant provided to the metering assemblies 140a/b.

The first metering assembly 140a is fluidly coupled to the pump 122, and the second metering assembly 140b is fluidly coupled to the first metering assembly 140a in series with the pump 122. The pump 122 is configured to provide the reductant to the first metering assembly 140a, and to the second metering assembly 140b via the first metering assembly 140a, such that a first reductant pressure in the first metering assembly 140a is equal to a second reductant pressure in the second metering assembly 140b.

For example, one or more fluidic couplings between the pump 122 and the first metering assembly 140a, and between the first metering assembly 140a and the second metering assembly 140b may have a negligible pressure drop (e.g., include high pressure jumper tubes). This allows the fluid to be pumped from the pump 122 to the first metering assembly 140a, and therethrough to the second metering assembly 140b with negligible pressure drop therebetween. While FIG. 1 shows the reductant insertion assembly 120 as including the first metering assembly 140a and the second metering assembly 140b, any number of metering assemblies may be connected in series with the pump 122 (e.g., 2, 3, 4, 5, 6 or even more).

Figure 6A:
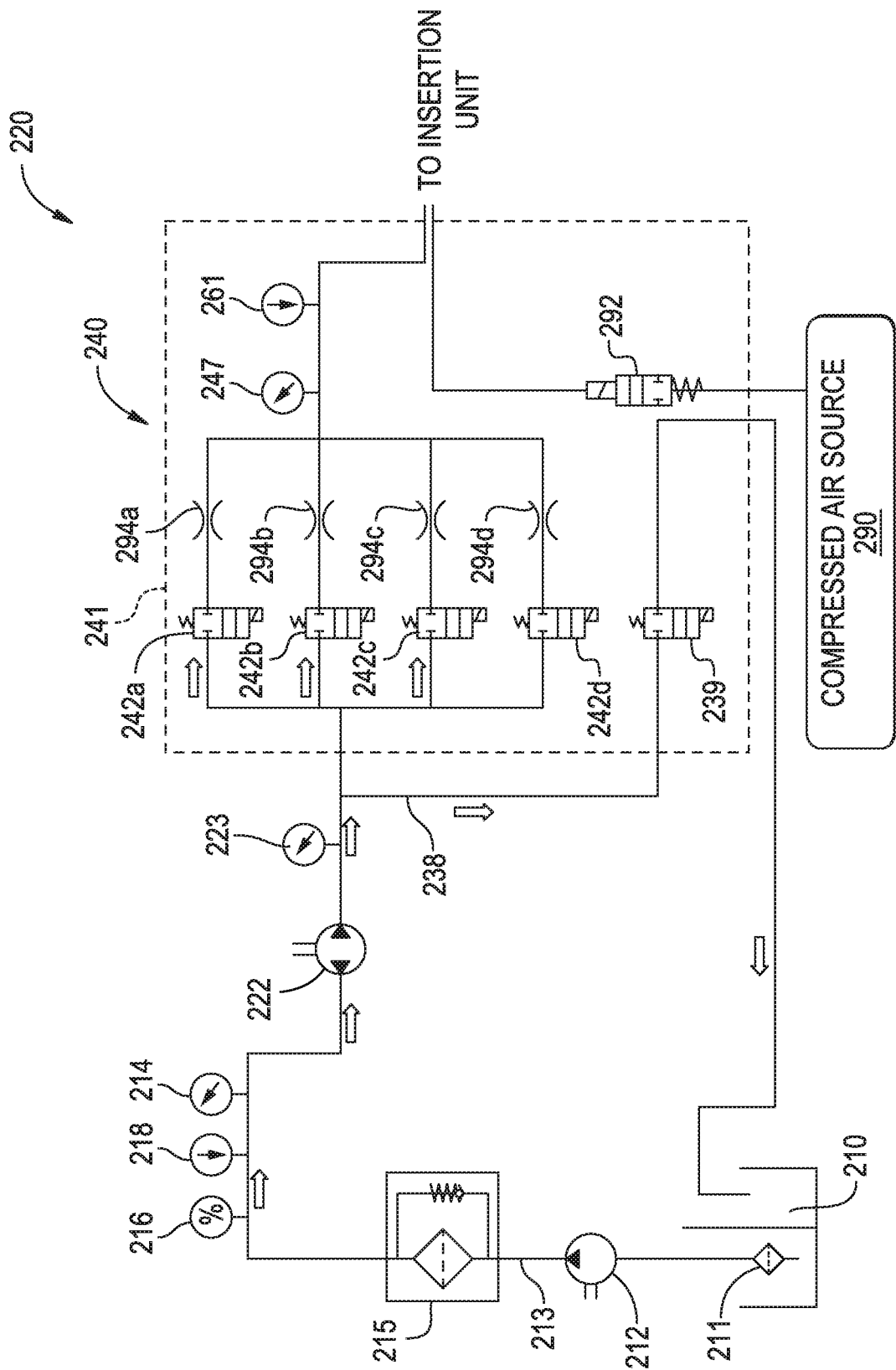
FIG. 6A is a schematic illustration of an example fluidic circuit of the reductant insertion assembly of FIG. 2, according to a particular embodiment.

In particular embodiments, a downstream pressure sensor (e.g., the downstream pressure sensor 223 as described with respect to FIG. 6A) may be positioned downstream of the pump 122 and upstream of the first metering assembly 140a. The downstream pressure sensor may be configured to measure a downstream reductant pressure between the pump 122 and the first metering assembly 140a. The pump 122 may be configured to adjust a pumping pressure thereof based on the downstream reductant pressure so as to provide the reductant to the first metering assembly 140a and the second metering assembly 140b at the first reductant pressure and the second reductant pressure (i.e., the same or about the same pressure), respectively.

The first metering assembly 140a, the second metering assembly 140b and any other metering assemblies fluidly coupled in series with the pump 122 (e.g., to the second metering assembly 140b and so on) may be substantially similar to each other. In other words, the reductant insertion assembly 120 may be modular allowing for fluidic coupling of one or more metering assemblies in series with the pump 122 and a provide the reductant at the same or about the same pressure to each of the metering assemblies (e.g., the metering assemblies 140a/b) using only the pump 122. This provides significant reduction in manufacturing and maintenance costs relative to conventional reductant insertion assemblies that employ a dedicated pump for each metering assembly. Furthermore, the modular configuration allows for flexibility in increasing or decreasing the number of metering assemblies based on a target application.

In various embodiments, the first metering assembly 140a comprises a first reductant inlet 144a fluidly coupled to the pump 122. A first reductant outlet 146a is fluidly coupled to the first insertion unit 156a and configured to provide the reductant at a predetermined pressure and flow rate thereto. A first reductant transfer outlet 148a is fluidly coupled to the second metering assembly 140b. The first metering assembly 140a also comprises a set of first metering valves 142a/b. Each of the set of first metering valves 142a/b are fluidly coupled to the first reductant outlet 146a and configured to be selectively activated so as to communicate the reductant to the first reductant outlet 146a, and thereby the first insertion unit 156a at a predetermine pressure and flow rate corresponding to the activated first metering valve 142a/b. Each of the set of first metering valves 142a/b may include any suitable valve, for example, a butterfly valve, a plate valve, a pressure activated valve, an air activated valve (e.g., an air injector) or any other suitable valve. In particular embodiments, each of the first set of metering valves 142a/b comprise a 2-way solenoid actuated valve. While FIG. 1 shows the first metering assembly 140a as including two first metering valves 142a/b, in other embodiments, the first metering assembly 140a may have any number of first metering valves (e.g., 3, 4, 5, 6 or even more).

In some embodiments, the set of first metering valves 142a/b also comprise a plurality of first nozzles (e.g., the nozzles 294a/b/c/d described with respect FIG. 6A). The plurality of nozzles may include, for example orifices. Each of the plurality of first nozzles may correspond to a first metering valve 142a/b and may have a predetermined first nozzle diameter configured to provide the reductant to the first reductant outlet 146a at the predetermined pressure and flow rate corresponding to the first metering valve 142a/b associated with the corresponding first nozzle. In other words, each of the first metering valve 142a/b includes a unique first nozzle (e.g., an orifice) positioned downstream thereof and upstream of the first reductant outlet 146a. A first nozzle diameter of the each of the first nozzles may be different from each other (e.g., in a range of 0.1 mm to 1.0 mm), and configured to provide the reductant to the first insertion unit 156a (e.g., an injector or dosing lance) at a particular pressure and flow rate based on the operating pressure of the reductant provided by the pump 122 and the first nozzle diameter.

Since each of the first metering valve 142a/b is positioned between the first reductant inlet 144a and the first reductant outlet 146a, opening of a particular first metering valve (e.g., the first metering valve 142a or 142b) causes the reductant to flow through the open first metering valve 142a or 142b towards the first reductant outlet 146a. The corresponding nozzle positioned downstream of the open first metering valve 142a or 142b then provides the reductant to the first insertion unit 156a at the predetermined pressure and flow rate corresponding to the first nozzle associated with the open first metering valve 142a or 142b. In this manner, the reductant may be provided to the first insertion unit 156a at a predetermined pressure and flow rate by selectively opening the first metering valve 142a or 142b, or any other first metering valve that may be included in the first metering assembly 140a.

In some embodiments, the second metering assembly 140b may comprise a second reductant inlet 144b fluidly coupled to the first reductant transfer outlet 148a of the first metering assembly 140a, and a second reductant outlet 146b fluidly coupled to the second insertion unit 156b. The second metering assembly 140b also comprises a set of second metering valves 142c/d, which may be substantially similar to the set of first metering valves 142a/b. Each of the set of second metering valves 142c/d are fluidly coupled to the second reductant outlet 146b and configured to be selectively activated so as to communicate the reductant to the second reductant outlet 146b and therefrom, to the second insertion unit 156b, at a predetermined pressure and flow rate corresponding to the activated second metering valve 142c/d, as described with respect to the first metering assembly 140a. Furthermore, the set of second metering valves 142c/d may comprise a plurality of second nozzles. Each of the plurality of second nozzles may correspond to a second metering valve 142c/d and have a predetermined second nozzle diameter configured to provide the reductant to the second reductant outlet 146b, and thereby the second insertion unit 156b at the predetermined pressure and flow rate corresponding to the second metering valve 142c/d associated with the corresponding 140a.

As described previously, the first metering assembly 140a and the second metering assembly 140b may be substantially similar to each other. For example, the second metering assembly 140b may also have a second reductant transfer outlet configured to be coupled to a third metering assembly, which may be substantially similar to the first metering assembly 140a and the second metering assembly 140b, in series with the pump 122. In such configurations, the pump 122 may be configured to provide the reductant to the third metering assembly through the second metering assembly 140b at a third reductant pressure which is equal to the first reductant pressure and the second reductant pressure. As shown in FIG. 1, the reductant insertion assembly 120 includes only the first metering assembly 140*a* the second metering assembly 140*b*. In such arrangements, the second reductant outlet 146*b* of the second metering assembly 140*b* may be plugged or capped, or the second metering assembly 140*b* may include a terminating metering assembly structured to exclude the reductant transfer outlet.

In some embodiments, the reductant insertion assembly 120 may also comprise a plurality of reductant outlet pressure sensors. For example, as shown in FIG. 1 a first reductant outlet pressure sensor 147*a* is positioned downstream of the first metering assembly 140*a*, and a second reductant outlet 146*b* pressure sensor 147*b* positioned downstream of the second metering assembly 140*b*. The reductant outlet pressure sensors 147*a/b* may be configured to measure a reductant outlet pressure of the reductant downstream of the first metering assembly 140*a* and the second metering assembly 140*b*, respectively. Moreover, the pump 122 may be configured to adjust a pumping pressure thereof based on the reductant outlet pressure downstream of the first metering valves 142*a/b* and the second metering valves 142*c/d*. For example, an average or a weighted average of the reductant outlet pressures measured by the reductant outlet pressure sensors 147*a/b* may be used to adjust an operating parameter (e.g., an rpm) of the pump 122 so as to adjust the pumping pressure thereof, for example to allow delivery of the reductant to the first insertion unit 156*a* and the second insertion unit 156*b* at a target pressure and target flow rate.

In other embodiments, any one of the first insertion unit 156*a* and the second insertion unit 156*b* may demand a higher precisions or accuracy in insertion of the reductant in the SCR system 150. In such embodiments, the pump 122 may adjust the pumping pressure thereof based on the target reductant pressure and/or target flow rate at the insertion unit (e.g., the insertion units 156*a/b*) demanding the higher accuracy. In particular embodiments, a compressed air source (e.g., the compressed air source 290, as described with respect to FIG. 6A) may also be fluidly coupled to the reductant insertion assembly 120 and/or the insertion units 156*a/b*. The compressed air source may include an air tank or recycled exhaust gas. The reductant insertion assembly 120 may also include a mixer or blender configured to mix the air with the reductant communicated to the insertion units 156*a/b*, so as to provide air-assisted reductant insertion into the SCR system 150.

Figure 2:
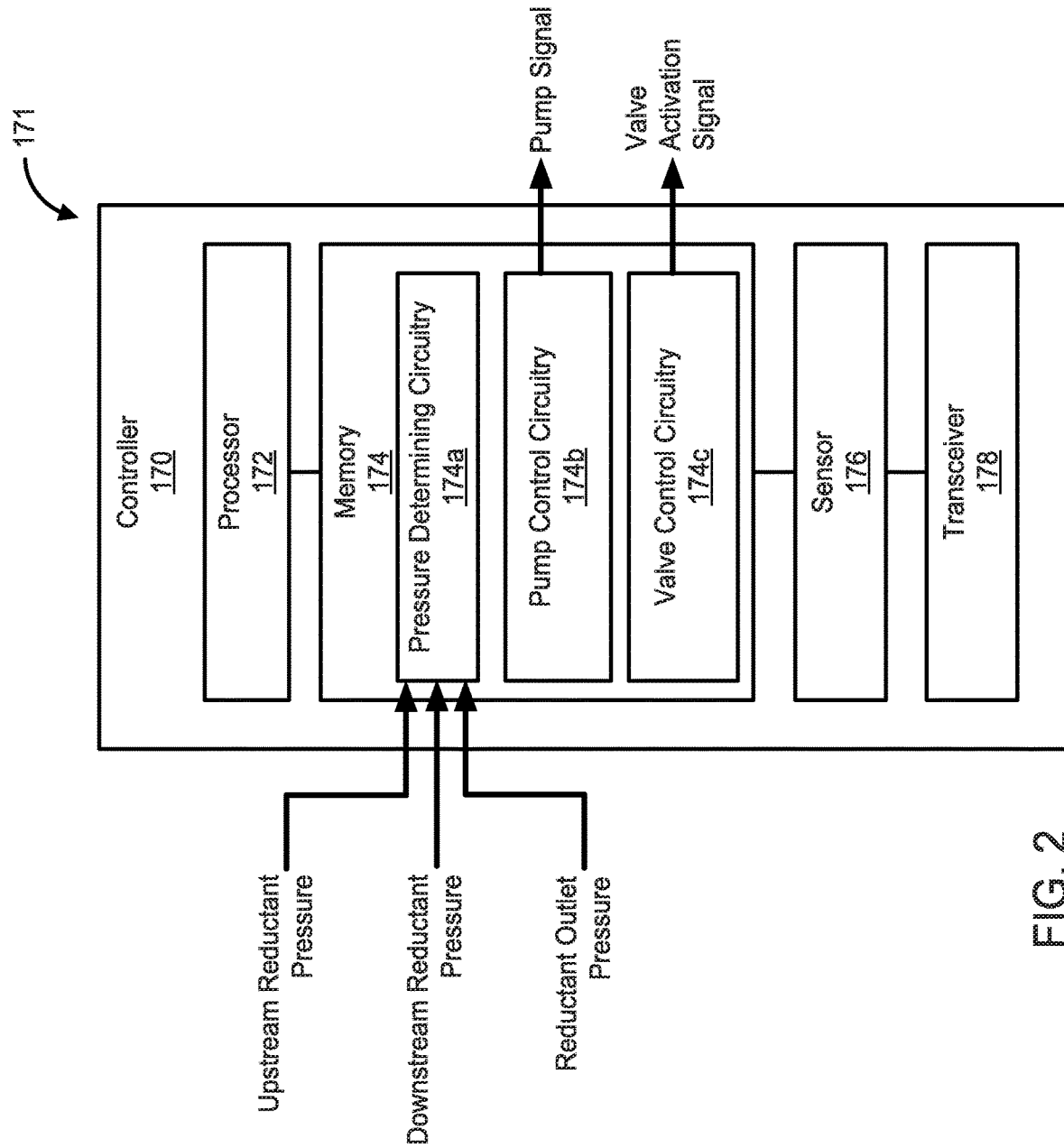
FIG. 2 is schematic block diagram of a control circuitry that can include the controller included in the aftertreatment system of FIG. 1, according to an embodiment.

In particular embodiments, the aftertreatment system 100 also comprises a controller 170. The controller 170 is communicatively coupled to the reductant insertion assembly 120. Specifically, the controller 170 is communicatively coupled to each of the pump 122, the first metering assembly 140*a* and the second metering assembly 140*b*. The controller 170 is configured to selectively activate the first metering assembly 140*a* and the second metering assembly 140*b* so as to communicate the reductant to the SCR system 150 via the first insertion unit 156*a* positioned at the first location, and via the second insertion unit 156*b* positioned at the second location, respectively of the SCR system 150. FIG. 2 is a schematic block diagram of an embodiment of a control circuitry 171 which can include the controller 170. The controller 170 includes a processor 172, a memory 174 or other computer readable medium, a sensor 176 and a transceiver 178. It should be understood that the control circuitry 171 shows only one embodiment of a control circuitry and any other controller capable of performing the operations described herein can be used (e.g., the computing device 930).

The processor 172 can include a microprocessor, programmable logic controller (PLC) chip, an ASIC chip, or any other suitable processor. The processor 172 is in communication with the memory 174 and configured to execute instructions, algorithms, commands or otherwise programs stored in the memory 174.

The memory 174 includes any of the memory and/or storage components discussed herein. For example, memory 174 may include RAM and/or cache of processor 172. Memory 174 may also include one or more storage devices (e.g., hard drives, flash drives, computer readable media, etc.) either local or remote to controller 170. The memory 174 is configured to store look up tables, algorithms or instructions.

For example, the memory 174 includes a pressure determining circuitry 174*a*, a pump control circuitry 174*b*, and a valve control circuitry 174*c*. The pressure determining circuitry 174*a* may be configured to receive an upstream pressure signal from the upstream pressure sensor 114 and determine the upstream reductant pressure therefrom. The pressure determining circuitry 174*a* may also be configured to receive a downstream pressure signal (e.g., from the downstream pressure sensor 223 shown in FIG. 6A), and determine the downstream reductant pressure therefrom. Moreover, the pressure determining circuitry 174*a* may be configured to receive reductant outlet pressure signals from the reductant outlet pressure sensors 147*a/b* and determine the reductant outlet pressures corresponding to the first metering assembly 140*a* and the second metering assembly 140*b* therefrom. In various embodiments, the sensor 176 may be configured to sense the various pressure signals (e.g., a current or voltage) and communicate information corresponding to the various pressure signal to the pressure determining circuitry 174*a*.

The pump control circuitry 174*b* is configured to activate and/or adjust an operating parameter of the pump 122, for example to control a pumping pressure thereof based on the upstream reductant pressure, the downstream reductant pressure and/or the reductant outlet pressure determined by the pressure determining circuitry 174*a*. For example, the pump control circuitry 174*b* may generate a pump signal configured to adjust a pumping pressure of the pump 122 (e.g., by adjusting an rpm thereof) based on the upstream reductant pressure and/or the downstream reductant pressure, so as to provide the reductant to the first metering assembly 140*a* and the second metering assembly 140*b* at the first reductant pressure and the second reductant pressure, respectively. In other embodiments, the pump control circuitry 174*b* may be configured to adjust a pumping pressure of the pump 122 based on the reductant outlet pressures so as to provide the reductant to the first reductant outlet 146*a* and the second reductant outlet 146*b* at a corresponding predetermined reductant pressure and flow rate (e.g., based on a target pressure and/or target flow rate at the insertion units 156*a/b*).

The valve control circuitry 174*c* is configured to selectively activate the first metering valve 142*a/b* or the second metering valve 142*c/d* to communicate the reductant to the insertion units 156*a/b* at a target pressure and/or target flow rate. For example, valve control circuitry 174*c* may be configured to determine a target pressure and target flow rate of the reductant at the first reductant outlet 146*a*, and selectively activate a corresponding first metering valve 142*a/b* which is structured to provide the reductant to the first reductant outlet 146*a* at the target pressure and target flow rate. Similarly, the valve control circuitry 174*c* may also be configured to determine a target pressure and target flow rate of the reductant at the second reductant outlet 146*b*, and selectively activate a corresponding second metering valve 142*c/d* which is structured to provide the reductant to the second reductant outlet 146*b* at the target pressure and target flow rate.

As previously described herein, the aftertreatment system 100 can include the first sensor 103, the second sensor 105, or any other sensors such as, for example, temperature sensors, pressure sensors, NOx sensors, oxygen sensors, ammonia sensors and/or any other sensors. The controller 170 may be communicatively coupled to one or more such sensors to receive and interpret signals from one or more of these sensors. The controller 170 may use the information from one or more of these sensors to determine the flow conditions of the exhaust gas, for example to determine the target pressure and/or target flow rate at the insertion units 156*a/b*. In particular embodiments, the controller 170 can also be configured to receive and interpret data from the engine 10 so as to determine one or more engine operating parameters (e.g., engine speed, torque, temperature, compression ratio, knock, etc.). The controller 170 may use the one or more engine operating parameters to determine the target pressure and/or target flow rates of the reductant at the insertion units 156*a/b*.

Figure 3:
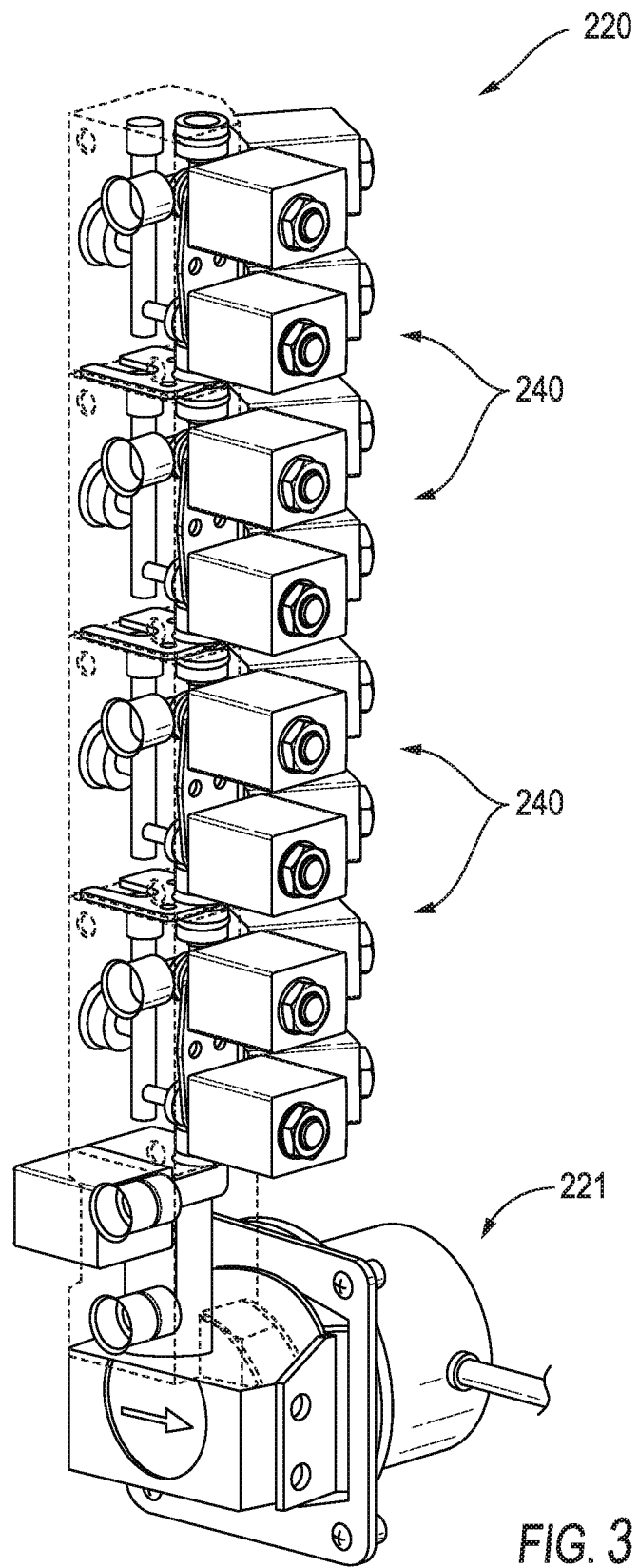
FIG. 3 is a perspective view of reductant insertion assembly, according to another embodiment.

FIG. 3 is a perspective view of a reductant insertion assembly 220, according to another embodiment. The reductant insertion assembly 220 may be used with the aftertreatment system 100 or any other aftertreatment system described herein. The reductant insertion assembly 220 comprises a pump assembly 221 and a plurality of metering assemblies 240 fluidly coupled in series with the pump assembly 221.

Figure 4:
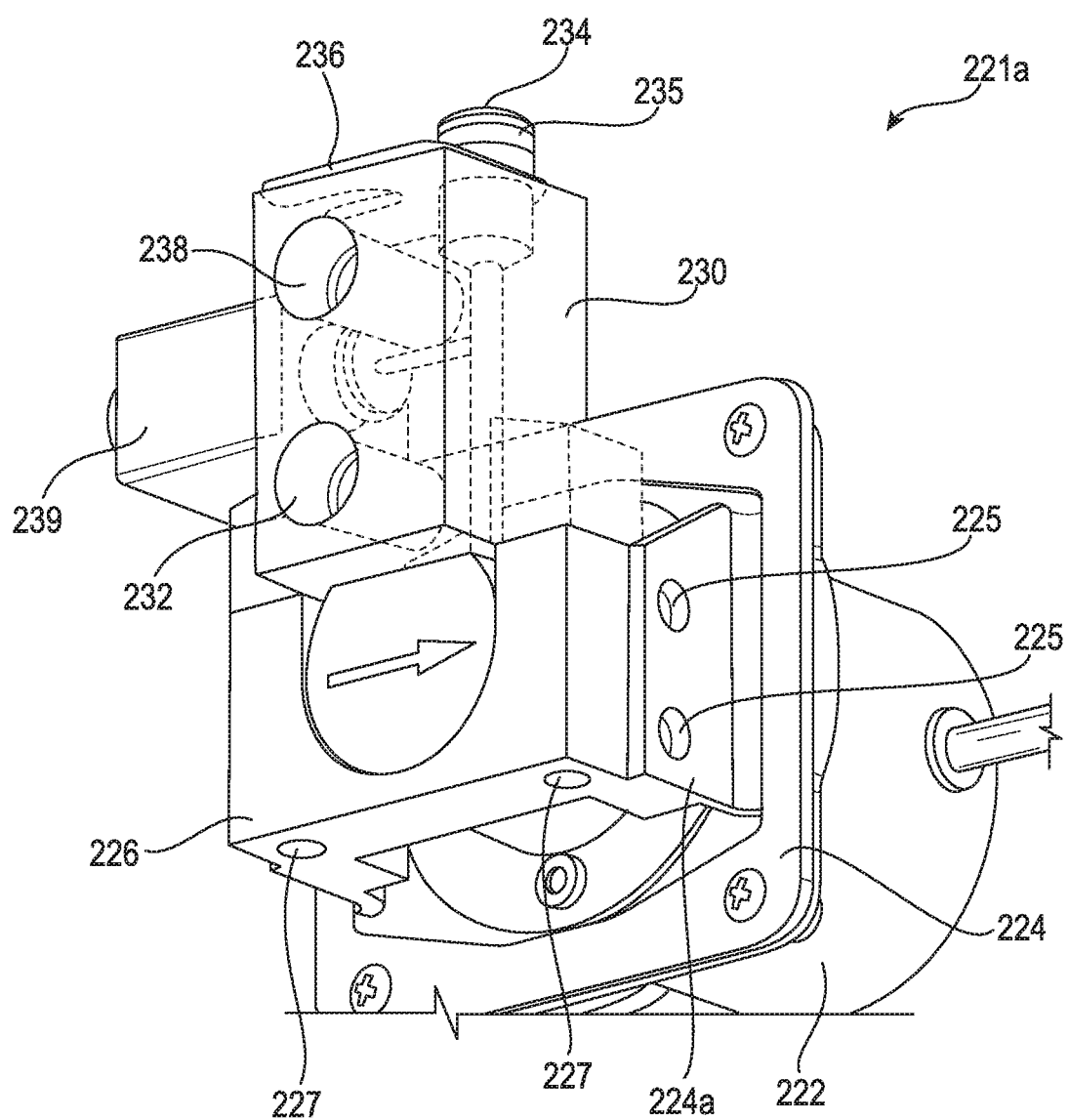
FIG. 4 is a perspective view of a pump assembly included in the reductant insertion assembly of FIG. 2.

FIG. 4 is a perspective view of the pump assembly 221. The pump assembly 221 comprises a pump 222 structured to receive the reductant from a reductant storage tank 210 shown in FIG. 6A, and pressurize the reductant to an operating pressure of the pump 222. The pump 222 is configured to provide the reductant at the operating pressure to each of the plurality of metering assemblies 240 so as to allow the plurality of metering assemblies 240 to insert the reductant into an SCR system (e.g., the SCR system 150) at a predetermined pressure and/or flow rate. The pump 222 may include any suitable pump, for example a centrifugal pump, a rotary pump, a vacuum pump, a plate pump, a diaphragm or membrane pump, or any other suitable pump. In particular embodiments, the pump 222 includes a fixed displacement gear pump. An rpm or pumping speed of the pump 222 included in the pump assembly 221 may be adjustable so as to allow the pump 222 to adjust the operating pressure of the reductant provided to the plurality of metering assemblies 240, such that a reductant pressure in each of the plurality of metering assemblies 240 is the same. In various embodiments, the pump 222 may be a reversible pump configured to pump the reductant to the plurality of metering assemblies 240 or away therefrom (e.g., to maintain a pressure therewithin).

A mounting plate 224 is coupled to a body or otherwise housing of the pump 222. A pair of mounting arms 224*a* extend from the mounting plate 224 perpendicular thereto in a direction away from the pump 222. A plurality of coupling apertures 225 are provided on each of the mounting arms 224*a*. A mounting bracket 226 is positioned between the pair of mounting arms 224*a* and coupled thereto via the plurality of coupling apertures 225, for example via coupling members (e.g., screws, bolts, rivets, etc.) inserted through the plurality of coupling apertures 225. In other embodiment, the mounting bracket 226 may be coupled to the mounting arms 224*a* using any other suitable coupling mechanism (e.g., a snap-fit or friction-fit mechanism, welding, thermal bonding, etc.). A plurality of mounting apertures 227 are formed in the mounting bracket 226. The plurality of mounting apertures 227 may include throughholes positioned perpendicular to the pair of mounting arms 224*a*, and configured to mount the pump assembly 221 on a corresponding mounting structure, for example a corresponding mounting structure provided in an enclosure housing the reductant insertion assembly 220.

The pump assembly 221 also includes a pump manifold 230 defining an internal volume within which various components of the pump assembly 221 are positioned, as described herein. As shown in FIGS. 3-4, the pump manifold 230 has a rectangular cross-section. In other embodiments, the pump manifold 230 may have any suitable shape or size, for example, square, circular, oval, polygonal or any other suitable shape or size. The pump manifold 230 may be formed from any suitable material, for example metals, plastics or polymers.

The pump assembly 221 comprises a pump inlet 232 positioned in the pump manifold 230 and configured to receive the reductant from the reductant storage tank 210. The pump assembly 221 also comprises a pump outlet 234, positioned in the pump manifold 230. The pump outlet 234 comprises a circular tube extending out of the pump manifold 230 away from the mounting bracket 226. The pump outlet 234 is configured to be fluidly coupled to a reductant inlet 244 (shown in FIG. 5) of a corresponding metering assembly 240 of the plurality of metering assemblies 240, for example via insertion therein. A sealing member 235 (e.g., an O-ring or a gasket) is positioned around the pump outlet 234. The sealing member 235 may be configured to fluidly seal the coupling between the pump outlet 234 and the reductant inlet 244, for example when the pump outlet 234 is inserted into the reductant inlet 244. A pump manifold coupling collar 236 is positioned on the pump manifold 230 proximate to the pump outlet 234, and is configured to be coupled to a metering manifold 241 (shown in FIG. 5) of the corresponding metering assembly 240.

The pump assembly 221 also comprises a bypass outlet 238 configured to be fluidly coupled to the reductant storage tank 210. A bypass valve 239 is operably coupled to the bypass outlet 238. The bypass valve 239 is configured to selective activate so as to redirect the reductant flow away from the pump outlet 234 and towards the reductant storage tank 210 via the bypass outlet 238, for example to reduce a reductant pressure in the pump 222 and/or the plurality of metering assemblies 240. In this manner, the bypass valve 239 and the bypass outlet 238 provide over-pressure protection by allowing the pressurized reductant to bypass the metering assemblies 240, for example if the reductant pressure reaches or exceeds a predetermined reductant pressure threshold. In various embodiments, the bypass valve 239 may assist in priming of the pump 222 and/or a lift pump (e.g., the lift pump 212 shown in FIG. 6A) positioned upstream of the pump 222, for example, by allowing any air trapped in the delivery lines or return lines (e.g., when the reductant insertion assembly 220 is activated) to flow out of the reductant insertion assembly 220 into a reductant storage tank (e.g., the reductant storage tank 210 shows in FIG. 6A). Furthermore, the bypass valve 239 may allow the reductant to flow back to the reductant storage tank 210 freely bypassing restrictive orifices or nozzles.

Figure 5:
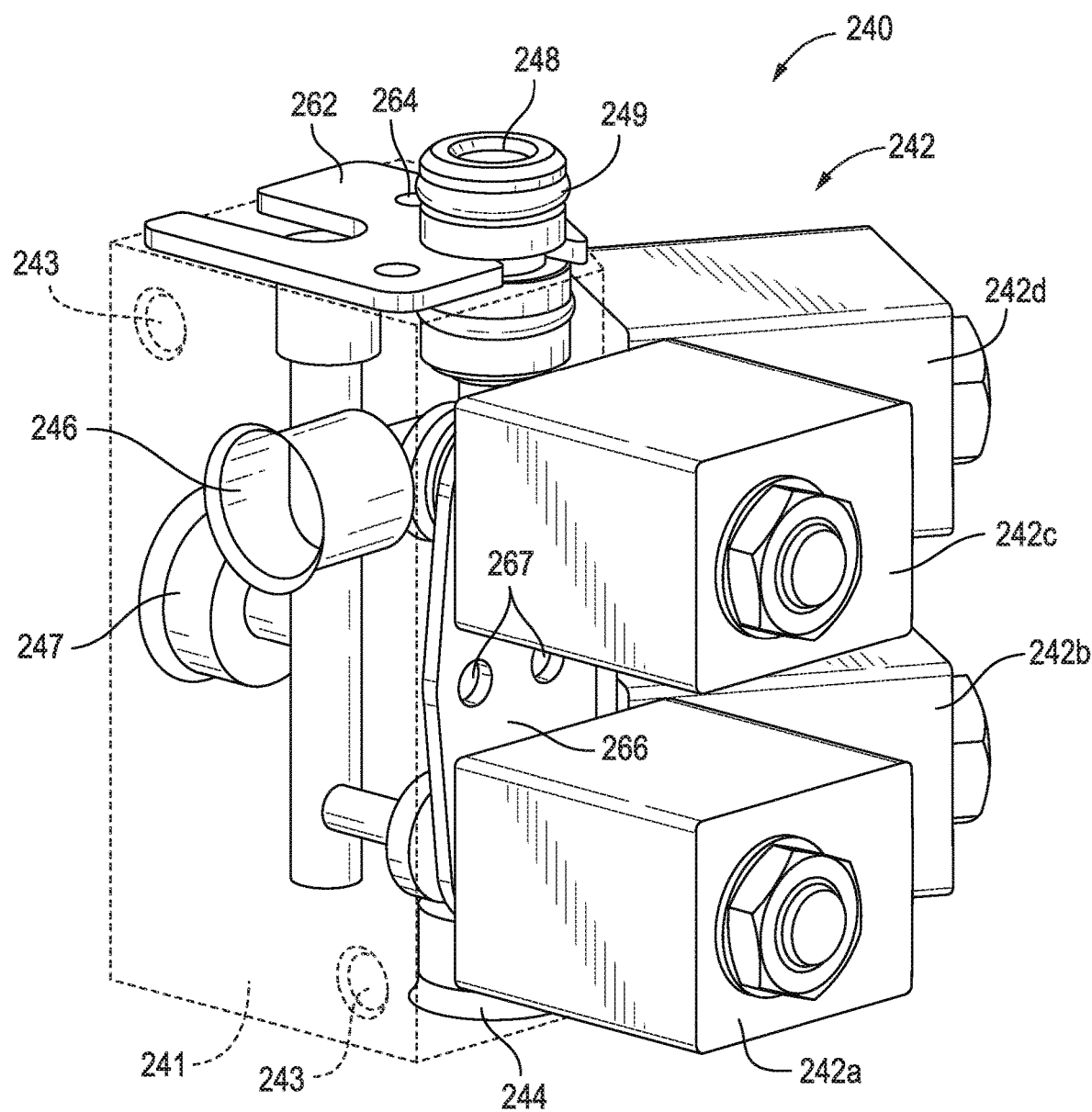
FIG. 5 is a perspective view of a metering valve of a plurality of metering valves included in the reductant insertion assembly of FIG. 2.

The plurality of metering assemblies 240 are fluidly coupled to the pump 222 in series therewith. FIG. 5 is a perspective view of a first metering assembly 240 of the plurality of metering assemblies 240, which is coupled to the pump 222. Each of the metering assemblies 240 is substantially similar to each other. While FIG. 3 shows the reductant insertion assembly 220 including four metering assemblies 240, in other embodiments, the reductant insertion assembly 220 may include any number of metering assemblies 240 fluidly coupled in series with the pump assembly 221, for example 2, 3, 4 or even more.

The metering assembly 240 comprises a metering manifold 241 defining an internal volume within which various components of the metering assembly 240 are positioned, as described herein. As shown in FIGS. 3 and 5, the metering manifold 241 has a rectangular cross-section. In other embodiments, the metering manifold 241 may have any suitable shape or size, for example, square, circular, oval, polygonal or any other suitable shape or size. The metering manifold 241 may be formed from any suitable material, for example metals, plastics or polymers. In particular embodiments, the metering manifold 241 may be substantially similar in size and the shape to the pump manifold 230. A plurality of metering assembly mounting apertures 243 may be defined on a sidewall of the metering manifold 241, and structured to allow mounting of the metering assembly 240 (e.g., via screws, rivets, bolts, etc.) to a mounting structure or a sidewall of an enclosure of the reductant insertion assembly 220.

The metering assembly 240 comprises a reductant inlet 244 structured to be coupled to the pump outlet 234, and a reductant outlet 246. A reductant outlet pressure sensor 247 is operably coupled to the reductant outlet 246 and configured to measure a reductant outlet pressure at the reductant outlet 246. The metering assembly 240 also comprises a reductant transfer outlet 248 comprising a circular tube extending out of the metering manifold 241 away from the reductant inlet 244. The reductant transfer outlet 248 is configured to be fluidly coupled to a reductant inlet 244 of a corresponding metering valve 242*a/b/c/d* of the plurality of metering valves 242*a/b/c/d*, for example via insertion therein.

A sealing member 249 (e.g., an O-ring or a gasket) is positioned around the reductant transfer outlet 248. The sealing member 249 may be configured to fluidly seal the coupling between the reductant transfer outlet 248 and the reductant inlet 244 of the corresponding metering assembly 240. A metering manifold coupling collar 262 is positioned on the metering manifold 241 proximate to the reductant transfer outlet 248, and is configured to be coupled to a metering manifold 241 of a corresponding metering assembly 240, for example via a plurality of metering collar coupling apertures 264 formed therein. In various embodiments, the reductant transfer outlet 248 may be substantially similar to the pump outlet 234, and the metering manifold coupling collar 262 may be substantially similar to the pump manifold coupling collar 236. This allows flexibility in assembly of the reductant insertion assembly 220, as well as provides modularity for coupling or uncoupling one or more metering assemblies 240 to the pump assembly 221.

The pump 222 is configured to provide the reductant to each of the plurality of metering assemblies 240 such that that the reductant pressure in each of the metering assemblies 240 is the same or about the same. For example, one or more fluidic couplings between the pump 222, and each of the metering assemblies 240 may have a negligible pressure drop. This allows the reductant to be pumped from the pump 222 to each of the plurality of metering assemblies 240 with negligible pressure drop therebetween.

The metering assembly 240 also comprises a set of metering valves 242 including a first metering valve 242*a*, a second metering valve 242*b*, a third metering valve 242*c* and a fourth metering valve 242*d*. Each of the set of metering valves 242*a/b/c/d* may include any suitable valve, for example, a butterfly valve, a plate valve, a pressure activated valve, an air activated valve (e.g., an air injector) or any other suitable valve. In particular embodiments, each of the set of metering valves 242*a/b/c/d* comprise a 2-state solenoid activated valve. The set of metering valves 242*a/b/c/d* are mounted on the metering manifold 241 via a valve retention collar 266. The valve retention collar 266 defines retention collar mounting apertures 267 configured to allow coupling of the valve retention collar 266 to the metering manifold 241 via coupling members, for example screws, bolts, rivets, etc.

In some embodiments, a compliance member (e.g., a Belleville spring, a helical spring, a coil spring, a rubber strip, a foam strip, etc.) may be positioned between the coupling members and the valve retention collar 266 and/or between the valve retention collar 266 and the metering manifold 241. The compliance member may be configured to allow cantilevered motion of the valve retention collar 266 so as to allow the set of metering valves to move axially relative to the metering manifold 241, for example to accommodate expansion or contraction of the metering assembly 240 due to temperature changes, or expansion of the reductant due to freezing at low ambient temperatures. Each of the set of metering valves 242*a/b/c/d* are fluidly coupled to the reductant outlet 246 and configured to be selectively activated so as to communicate the reductant to the reductant outlet 246 at a predetermine pressure and flow rate corresponding to the activated metering valve 242*a/b/c/d*.

In some embodiments, the set of metering valves 242*a/b/c/d* also comprise a plurality of nozzles, for example a first nozzle 294*a*, a second nozzle 294*b*, a third nozzle 294*c*, and a fourth nozzle 294*d* positioned downstream of the first metering valve 242*a*, the second metering valve 242*b*, the third metering valve 242*c* and the fourth metering valve 242*d*, as described with respect to FIG. 6A.

FIG. 6A is a schematic illustration of a fluidic circuit for providing reductant to an SCR system of an aftertreatment system (e.g., the SCR system 150 included in the aftertreatment system 100) which includes the reductant insertion assembly 220, according to a particular embodiment. The fluidic circuit includes the reductant storage tank 210 which stores a volume of the reductant (e.g., a diesel exhaust fluid). A tank filter 211 may be positioned in the reductant storage tank 210, for example at an inlet of a reductant delivery line 213 fluidly coupled to the reductant storage tank 210. The tank filter 211 may be configured to filter reductant deposits or crystals, or contaminants (e.g., dust, debris, etc.) from entering the reductant delivery line 213.

An upstream pump 212 is positioned in the reductant delivery line 213 and configured to pump the reductant from the reductant storage tank 210 to the pump 222 positioned downstream thereof. The upstream pump 212 may comprise a lift pump. A reductant filter 215 is positioned in the reductant delivery line 213 downstream of the upstream pump 212 and the upstream of the pump 222. The reductant filter 215 may be configured to filter reductant deposits or contaminants from the reductant and may also include a bypass circuit, for example to recirculate at least a portion of the reductant therein (e.g., to prevent excessive reductant pressure buildup).

The pump 222 is positioned downstream of the reductant filter 215. A urea quality sensor 216, a temperature sensor 218, and an upstream pressure sensor 214 is positioned upstream of the pump 222. The urea quality sensor 216 is configured to measure a percentage of urea in the reductant (e.g., an aqueous urea solution) The temperature sensor 218 is configured to measure a temperature of the reductant communicated to the pump 222. Furthermore, the upstream pressure sensor 214 is configured to measure an upstream reductant pressure upstream of the pump 222. The upstream pump 212 may be configured to adjust a pumping pressure thereof based on the upstream reductant pressure, so as to provide the reductant to the pump 222 at a predetermined upstream reductant pressure and/or flow rate (e.g., a rated inlet pressure or flow rate of the pump 222).

A downstream pressure sensor 223 is positioned downstream of the pump 222, and configured to measure a reductant pressure downstream thereof. The pump 222 may be configured to adjust a pumping pressure thereof based on the downstream reductant pressure so as to provide the reductant to the plurality of metering assemblies 240 at a predetermined reductant pressure and/or flow rate. The bypass valve 239 is operably coupled to the bypass outlet 238. The bypass valve 239 is configured to selective activate to redirect the reductant flow away from the pump outlet 234 and towards the reductant storage tank 210 via the bypass outlet 238, for example to reduce a reductant pressure in the plurality of metering assemblies 240, as previously described herein.

The pump 222 is fluidly coupled to the metering assembly 240. The metering assembly 240 comprises a metering manifold 241 and the set of metering valves 242a/b/c/d. While FIG. 6A shows the pump 222 being coupled to only one metering assembly 240, the pump 222 may be fluidly coupled to a plurality of metering assemblies in series therewith, as previously described herein. The plurality of metering assemblies may be operated similarly as described with respect to the metering assembly 240. The first nozzle 294a, the second nozzle 294b, the third nozzle 294c, and the fourth nozzle 294d positioned downstream of the first metering valve 242a, the second metering valve 242b, the third metering valve 242c and the fourth metering valve 242d, respectively. Each of the nozzles 294a/b/c/d may have a predetermined nozzle diameter configured to provide the reductant to the reductant outlet 246 of the metering assembly 240, and therefrom to an insertion unit (e.g., the insertion unit 156a or 156b) at the predetermined pressure and flow rate corresponding to the nozzles 294a/b/c/d. The nozzle diameter of the each of the nozzles 294a/b/c/d may be different from each other (e.g., in a range of 0.1 mm to 1.0 mm), and configured to provide the reductant to the corresponding insertion unit (e.g., an injector or dosing lance) at a particular pressure and flow rate based on the operating pressure of the reductant provided by the pump 222 and the corresponding nozzle diameter. In particular embodiments, the first nozzle 294a may have a nozzle diameter of 0.7 mm, the second nozzle 294b may have a nozzle diameter of 0.5 mm, the third nozzle 294c may have a nozzle diameter of 0.3 mm, and the fourth nozzle 294d may have a nozzle diameter of 1.0 mm.

A reductant outlet pressure sensor 247 and a reductant outlet temperature sensor 261 are positioned downstream of the nozzles 294a/b/c/d. The reductant outlet pressure sensor 247 may be configured to measure a reductant outlet pressure of the reductant downstream of the nozzles 294a/b/c/d. The pump 222 may be configured to adjust a pumping pressure thereof based on the reductant outlet pressure downstream of the nozzles 294a/b/c/d, for example to allow delivery of the reductant to the insertion unit at a target pressure and/or target flow rate. Furthermore, the reductant outlet temperature sensor 261 may be configured to measure a temperature of the reductant downstream the reductant outlet 246.

A compressed air source 290 may also be coupled to the reductant insertion assembly 220, and configured to provide compressed air for mixing with the reductant and providing air-assisted reductant delivery. A compressed air control valve 292 may be positioned downstream of the compressed air source and configured to control an amount of air mixed with the reductant. The compressed air source 290 may include an air tank or recycled exhaust gas. In some embodiments, an aftertreatment system (e.g., the aftertreatment system 100) including the reductant insertion assembly 220 may include a turbocharger. In such embodiments, the compressed air may be drawn from a turbine of the turbocharger and/or a compressor inlet of a compressor of the turbocharger. The reductant insertion assembly 220 may also include a mixer or blender configured to mix the air with the reductant communicated to the insertion unit, so as to provide air-assisted reductant insertion into the SCR system (e.g., the SCR system 150).

Figure 6B:
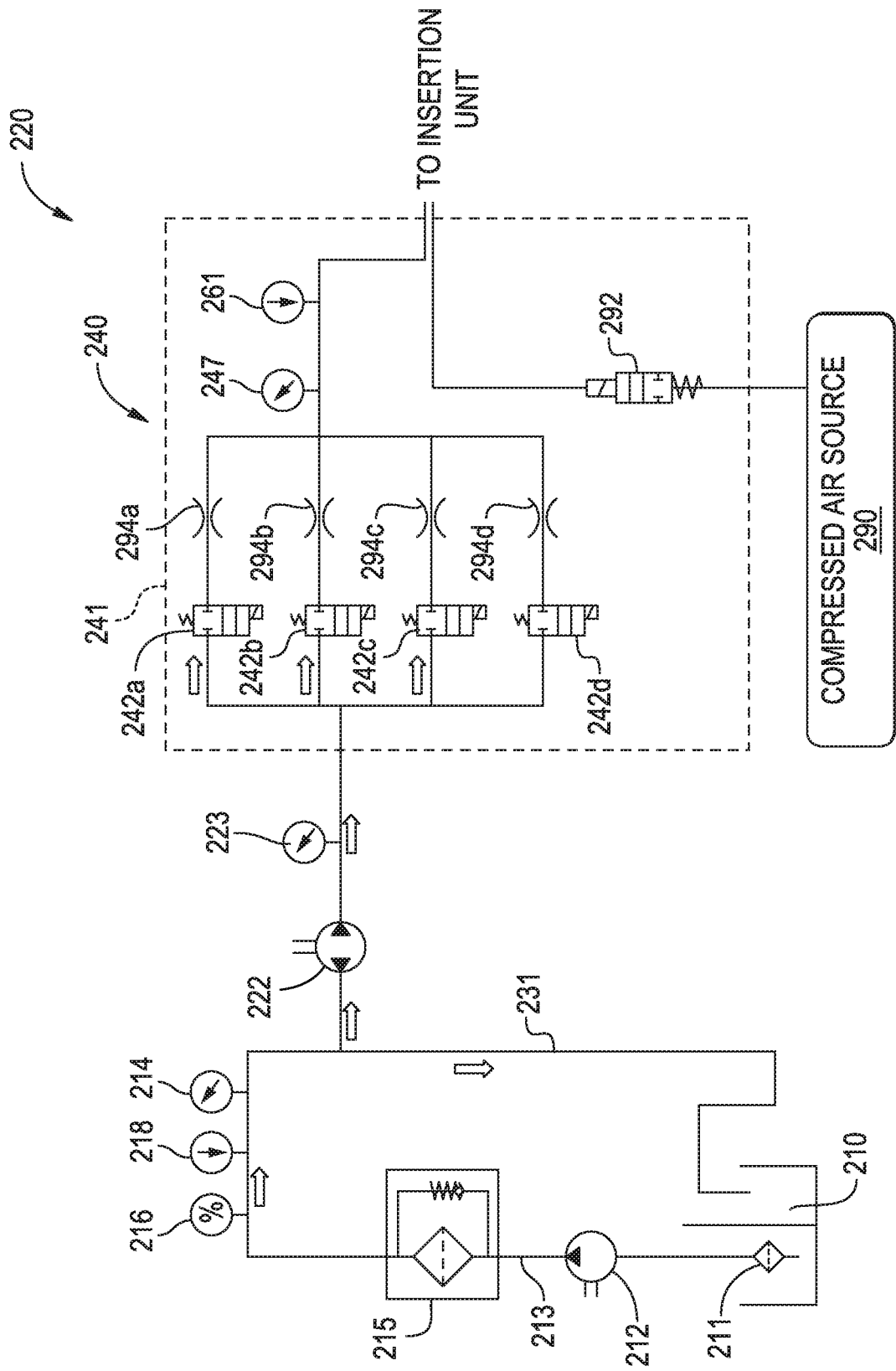
FIG. 6B is a schematic illustration of an example fluidic circuit which may be used with the reductant insertion assembly of FIG. 2 or FIGS. 9-11, according to another embodiment.

FIG. 6B is a schematic illustration of a fluidic circuit which may include the reductant insertion assembly 220, according to a particular embodiment. While described with respect to the reductant insertion assembly 220, the fluidic circuit may include any other reductant insertion assembly described herein (e.g., the reductant insertion assembly 1020 of FIGS. 9-11). The fluidic circuit of FIG. 6B is substantially similarly to the fluidic circuit of FIG. 6A except for the following differences.

The fluidic circuit shown in FIG. 6B does not include the bypass valve 239 shown in FIG. 6A. Instead, a reductant return line 231 is fluidly coupled to the reductant delivery line 213 upstream of the pump 222. In operation, the lift pump 212 operates at a constant flow rate which is always greater than a flow rate required by the pump 222 for insertion of the reductant into the metering assembly 240. A reductant first portion of the reductant pumped by the lift pump 212 through the reductant delivery line 213 is received by the pump 222. The pump 222 pressurized the reductant first portion and pumps it to the metering assembly 240 (or a plurality of metering assemblies) and therefrom, to the insertion unit. A reductant second portion of the reductant is returned to the reductant storage tank 210 via the reductant return line 231. Since the reductant second portion is always returned to the reductant storage tank 210, the bypass valve 239 can be excluded, thereby reducing complexity while providing protection from over-pressurization of the reductant insertion assembly 220.

Figure 7:
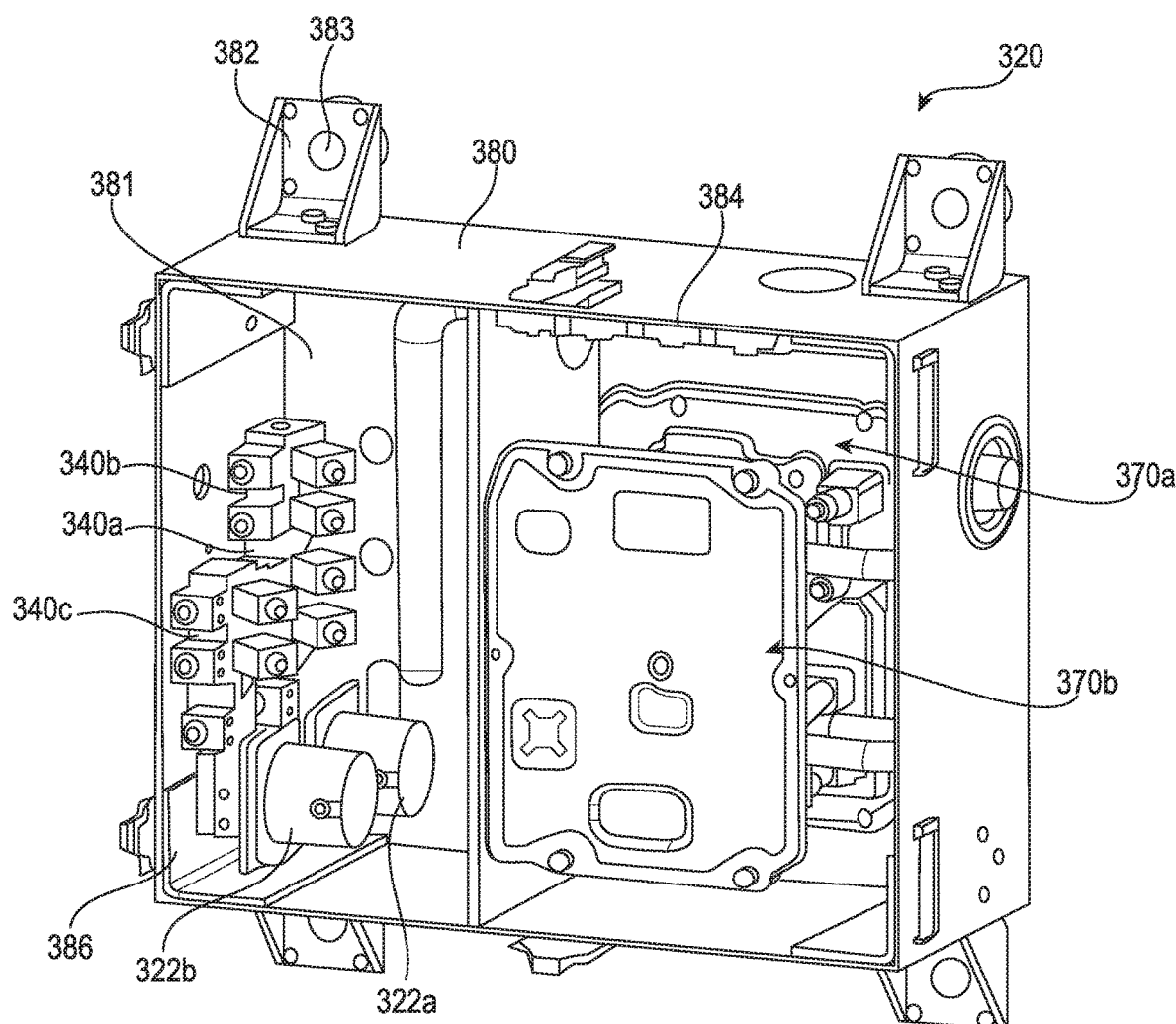
FIG. 7 is a perspective view of a reductant insertion assembly, according to yet another embodiment.

FIG. 7 is a perspective view of a reductant insertion assembly 320, according to another embodiment. The reductant insertion assembly 320 includes an enclosure 380 defining an internal volume 381 within which the components of the reductant insertion assembly 320 are positioned. The enclosure 380 comprises a plurality of enclosure mounts 382 for mounting the enclosure 380 on a mounting structure (e.g., an engine chassis or an aftertreatment system chassis). A plurality of vibration isolators 383 may be positioned between the enclosure mounts 382 and the mounting structure so as to limit an amount of vibration transmitted to reductant insertion assembly 320. One or more relays 384 (e.g., solid state relays) may also be positioned in the internal volume 381. In particular embodiment, the relays 384 may include heaters configured to heat the internal volume 381 or the reductant communicated into the reductant insertion assembly 320.

The reductant insertion assembly 320 also comprises a first pump 322a and a second pump 322b positioned within the internal volume 381. A first pump first metering assembly 340a is fluidly coupled to the first pump 322a, and a first pump second metering assembly 340b is fluidly coupled to the first pump first metering assembly 340a in series with the first pump 322a. The first pump first metering assembly 340a may be configured for low precision reductant delivery of the reductant to a first insertion unit, and the first pump second metering assembly 340b may be configured for low precision reductant delivery to a second insertion unit. As used herein the term "precision" as used in conjunction with reductant delivery may imply how accurately the corresponding metering assembly is able to match a target pressure and/or flow rate of the reductant to an insertion unit. For example, a metering assembly configured for high precision reductant delivery may be able to provide the reductant at a pressure and/or flow rate which is within ±1% of a target pressure or target flow rate at a corresponding insertion unit. Similarly, a metering assembly configured for low precision delivery may be able to provide the reductant at a pressure and/or flow rate which is within ±10% of a target pressure or target flow rate at a corresponding insertion unit.

A second pump first metering assembly 340c is fluidly coupled to the second pump 322b and configured for high precision delivery of the reductant to the first insertion unit or the second insertion unit. The first pump 322a and the second pump 322b may be mounted on a mounting structure 386 provided in the enclosure. The pumps 322a/b and the metering assemblies 340a/b/c may be substantially similar to the pump 122 or 222, and the metering assembly 140a/b or 240, respectively and therefore not described in further detail herein. A first controller 370a is communicatively coupled to the first pump 322a and the metering assemblies 340a/b, and configured to control the operation thereof. Furthermore, a second controller 370b is communicatively coupled to the second pump 322b and the metering assembly 340c and configured to control an operation thereof. The controllers 370a/b may be substantially similar to the controller 170, the control circuitry 171 or any other controller described herein. As shown in FIG. 7, the internal volume 381 provides substantial empty space around the pumps 322a/b and the metering assemblies 340a/b/c. The empty space may serve to provide air regulation and insulation from the high temperature exhaust gas flowing through an aftertreatment system (e.g., the aftertreatment system 100) which includes the reductant insertion assembly 320.

Figure 8A:
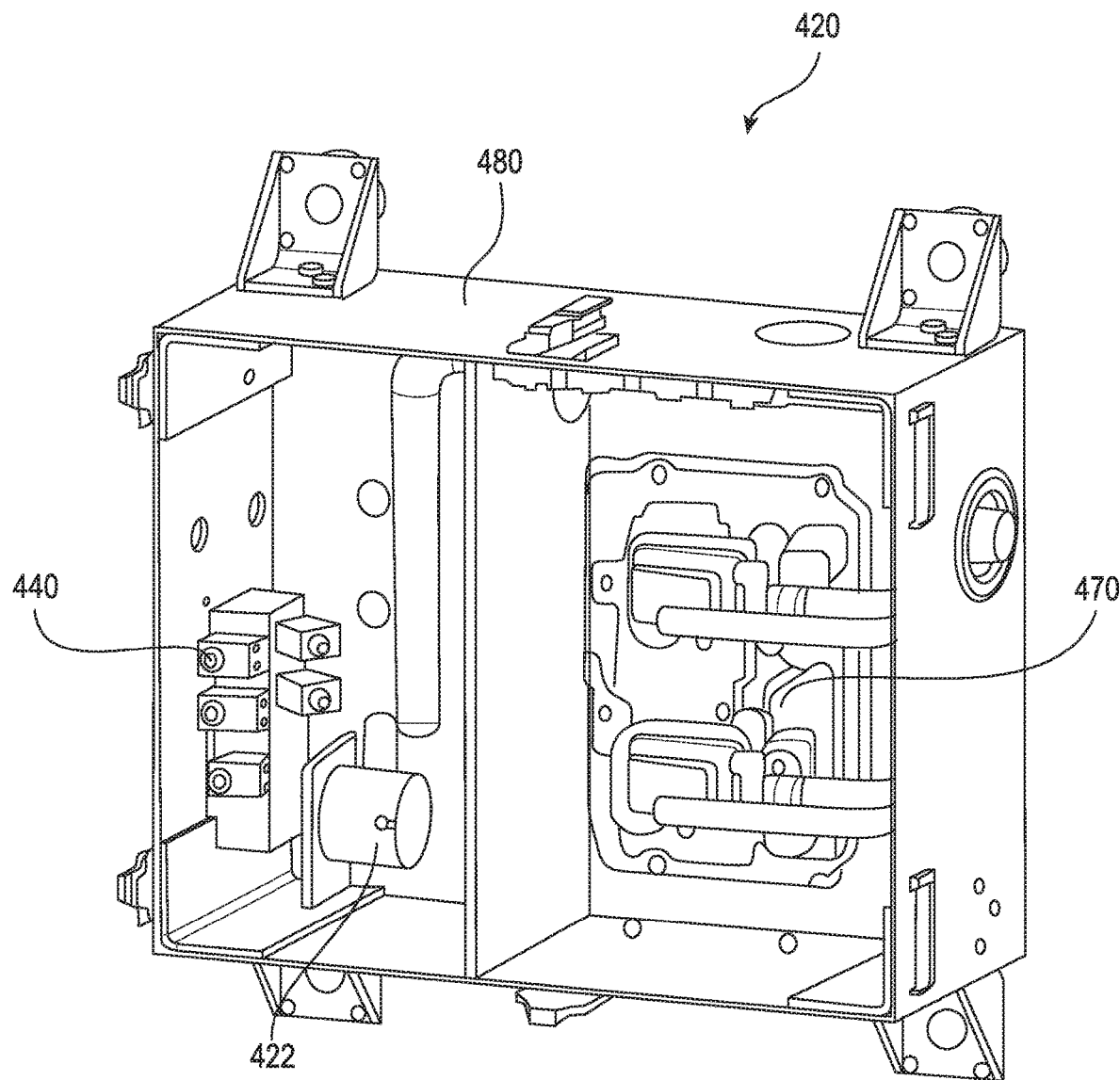
FIGS. 8A-C are perspective views of various reductant insertion assemblies, according to various embodiments.
Figure 8B:
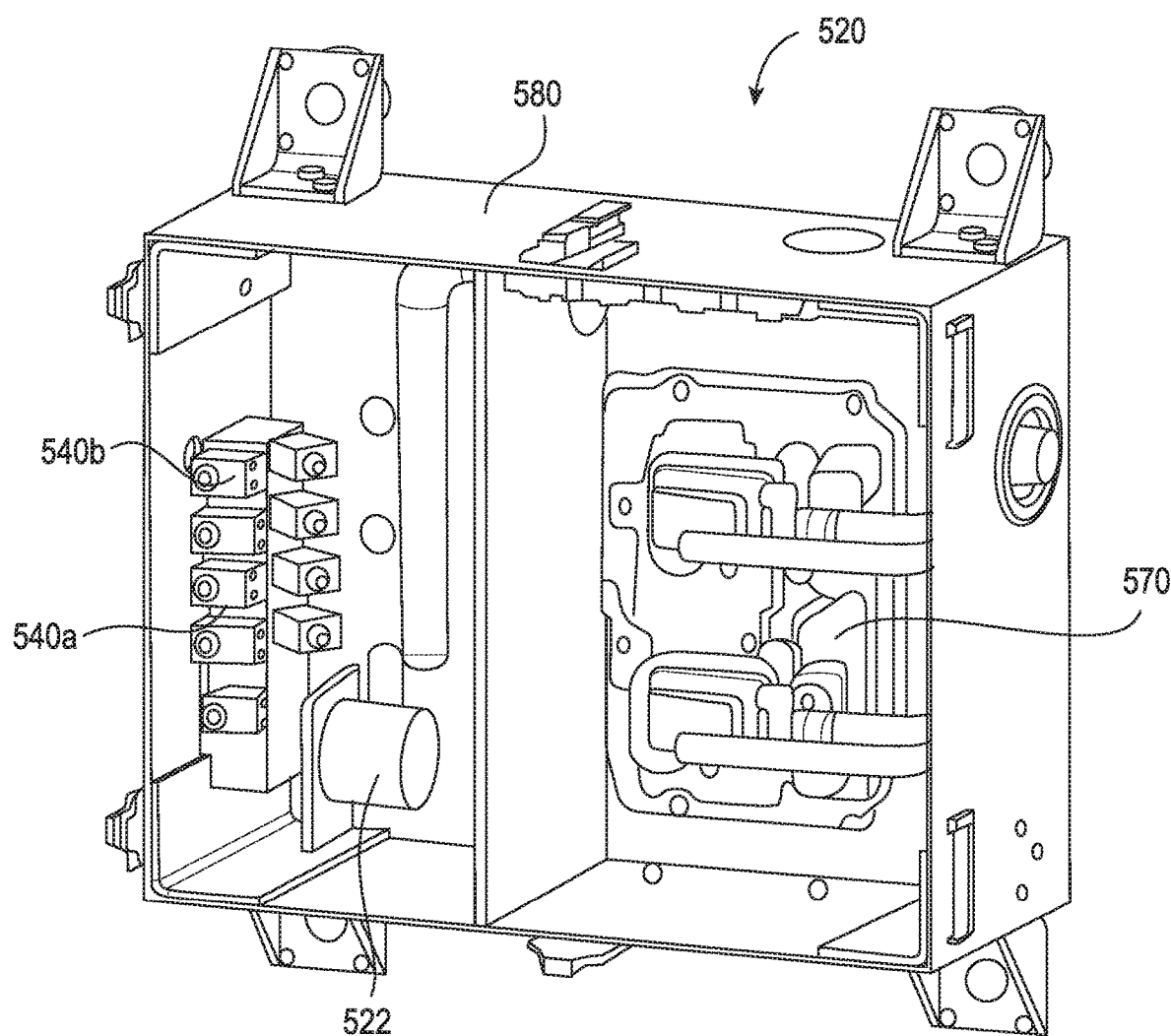
Figure 8C:
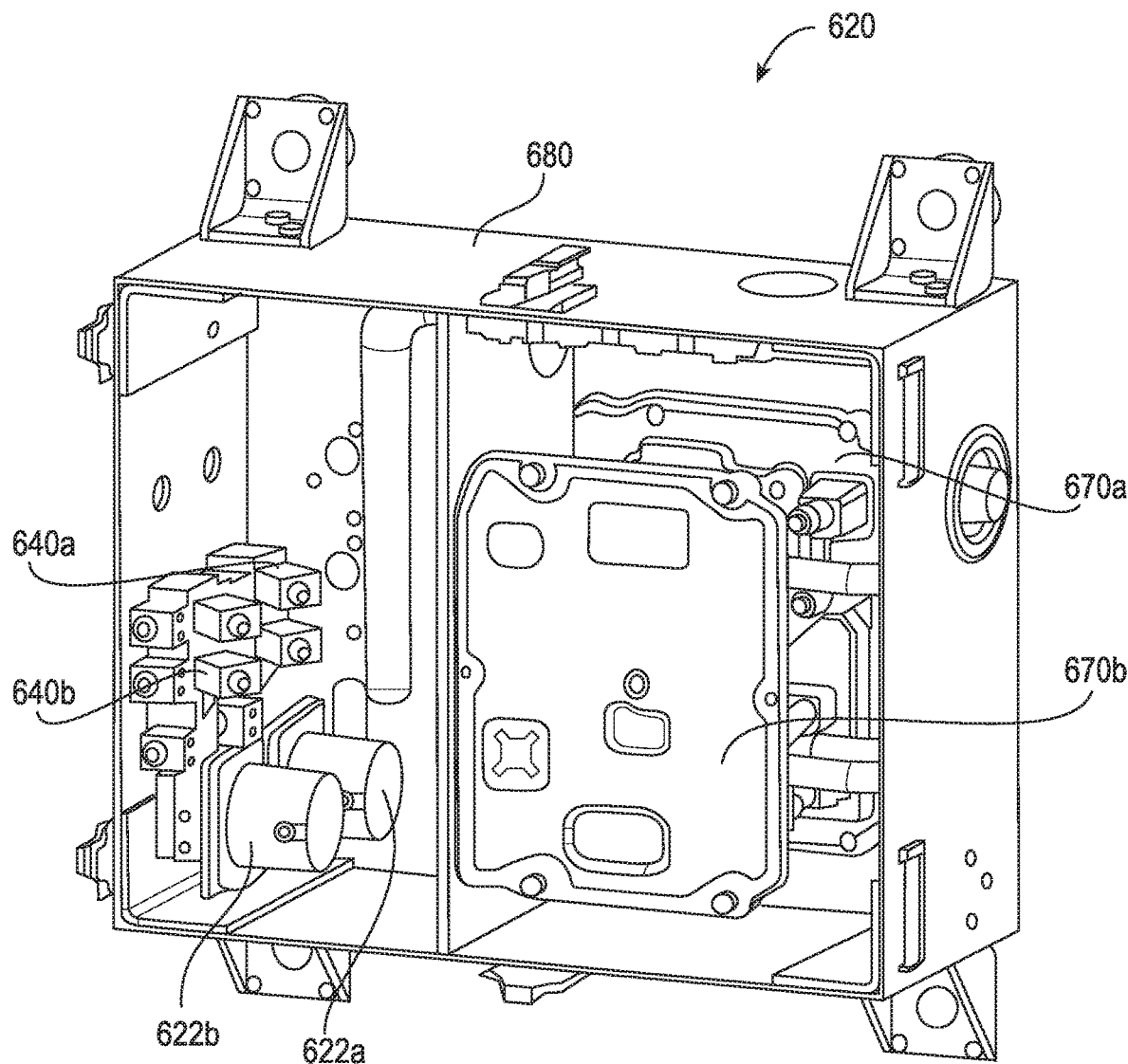

FIGS. 8A-C are perspective views of reductant insertion assemblies according to various embodiments. FIG. 8A is a perspective view of a reductant insertion assembly 420, according to a particular embodiment. The reductant insertion assembly 420 comprises an enclosure 480 defining an internal volume within which a pump 422 is positioned. A metering assembly 440 is fluidly coupled to the pump 422. A controller 270 is communicatively coupled to the pump 422 and the metering assembly 440 and configured to control an operation thereof. The reductant insertion assembly 420 is configured for high precision reductant delivery to an insertion unit.

FIG. 8B is a perspective view of a reductant insertion assembly 520, according to another embodiment. The reductant insertion assembly 520 comprises an enclosure 580 defining an internal volume within which a pump 522 is positioned. A first metering assembly 540a is fluidly coupled to the pump 522, and a second metering assembly 540b is fluidly coupled to the first metering assembly 540a in series with the pump 522. A controller 570 is communicatively coupled to the pump 522 and the metering assemblies 540a/b and configured to control an operation thereof. The reductant insertion assembly 520 is configured for low precision reductant delivery to a first insertion unit via the first metering assembly 540a, and a second insertion unit via the second metering assembly 540b.

FIG. 8C is a perspective view of a reductant insertion assembly 620, according to yet another embodiment. The reductant insertion assembly 620 comprises an enclosure 680 defining an internal volume within which a first pump 622a and a second pump 622b are positioned. A first metering assembly 640a is fluidly coupled to the first pump 622a, and a second metering assembly 640b is fluidly coupled to the second pump 622b. A first controller 670a is communicatively coupled to the first pump 622a and the first metering assembly 640a, and configured to control an operation thereof. Furthermore, a second controller 670b is communicatively coupled to the second pump 622b and the second metering assembly 640b, and configured to control an operation thereof. The reductant insertion assembly 620 is configured for high precision reductant delivery to a first insertion unit via the first metering assembly 640a, and a second insertion unit via the second metering assembly 640b. Thus the various reductant insertion assemblies described herein provide flexibility for tailoring the reductant insertion assemblies for a specific reductant insertion application.

Figure 9:
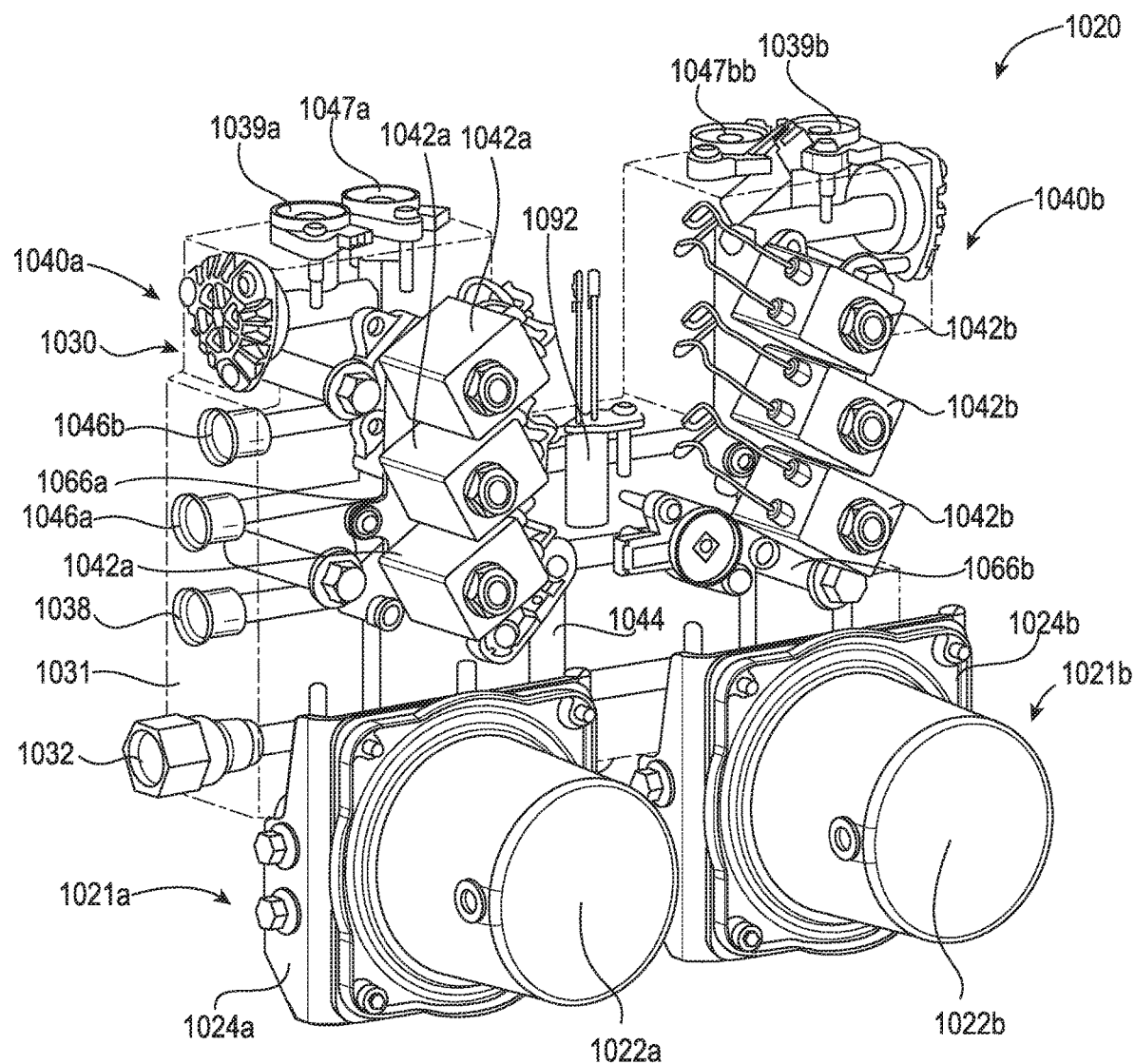
FIG. 9 is a perspective view of a reductant insertion assembly, according to another embodiment.

FIG. 9 is a perspective view of a reductant insertion assembly 1020, according to yet another embodiment. The reductant insertion assembly 1020 may be used with the aftertreatment system 100 or any other aftertreatment system described herein. The reductant insertion assembly 1020 comprises a first pump assembly 1021a having a first metering assembly 1040a fluidly coupled thereto, and a second pump assembly 1021b having a second metering assembly 1040b fluidly coupled thereto. The reductant insertion assembly 1020 may be used with the fluidic circuit of FIG. 6A, FIG. 6B or any other fluidic circuit described herein.

The first pump assembly 1022a comprises a pump 1022a structured to receive the reductant from a reductant storage tank (e.g., the reductant storage tank 110 or 210) and pressurize the reductant to an operating pressure of the pump 1022a. A first mounting plate 1024a is coupled to a body or otherwise housing of the pump 1022a and is structured to mount the pump assembly 1021a on a corresponding mounting structure. The second pump assembly 1022b is substantially similar to the first pump assembly 1022a, and includes a second pump 1022b, and a second mounting plate 1024b coupled thereto. The pumps 1022a/b are configured to provide the reductant at the operating pressure to the metering assemblies 1040a/b, respectively so as to allow the metering assemblies 1040a/b to insert the reductant into an SCR system (e.g., the SCR system 150) at a predetermined pressure and/or flow rate.

The pumps 1022a/b may include any suitable pumps, for example a centrifugal pump, a rotary pump, a vacuum pump, a plate pump, a diaphragm or membrane pump, or any other suitable pump. In particular embodiments, the pumps 1022a/b may include a fixed displacement gear pump. An rpm or pumping speed of the pumps 1022a/b included in the pump assembly 221 may be adjustable so as to allow the pumps 1022a/b to adjust the operating pressure of the reductant provided to the metering assemblies 1040a/b. In various embodiments, the pumps 1022a/b may include a reversible pump configured to pump the reductant to the metering assemblies 1040a/b respectively, or away therefrom (e.g., to maintain a pressure therewithin).

The reductant insertion assembly 1020 includes a manifold 1030 defining an internal volume within which various components of the pump assemblies 1021a/b and the metering assemblies 1040a/b are positioned, as described herein. Using only one manifold 1030 for housing the various components of the pump assemblies 1021a/b and the metering assemblies 1040a/b may facilitate handing of the reductant insertion assembly 1020, reduce space claim as well as facilitate installation of the reductant insertion assembly 1020. A temperature sensor 1044 may be positioned within the manifold 1030 and configured to measure a temperature of the internal volume of the manifold 1030, and/or a temperature of the reductant flowing through the pump assemblies 1021a/b and the metering assemblies 1040a/b. A heater 1092 may also be positioned within the manifold 1030 and may be configured, for example, to maintain a temperature of the internal volume defined by the manifold 1030.

A pump inlet 1032 is fluidly coupled to each of the pumps 1022a/b. The pump inlet 1032 is positioned through a first sidewall 1031 of the pump manifold 1030 such that, at least a portion of the pump inlet 1032 is positioned within the manifold 1030. The pump inlet 1032 is configured to receive the reductant from the reductant storage tank and communicate the reductant to each of the pumps 1022a/b. A reductant return outlet 1038 is fluidly coupled to the return inlet 1032. The reductant return outlet 1038 is positioned within the manifold 1030 and structured to communicate a portion of the reductant back to the reductant storage tank.

The first metering assembly 1040a is fluidly coupled to the first pump 1022a, and the second metering assembly 1040b is fluidly coupled to the second pump 1022b. The first metering assembly 1040a includes a set of first metering valves 1042a configured to provide the reductant at a first pressure and/or flow rate to a first insertion unit (e.g., the first insertion unit 156a). Furthermore, the second metering assembly 1040b comprises a set of second metering valves 1042b configured to provide the reductant at a second pressure and/or flow rate to a second insertion unit (e.g., the second insertion unit 156b). The first metering assembly 1040a and the second metering assembly 1040b may be substantially similar to each other.

Each of the set of metering valves 1042a/b may include any suitable valve, for example, a butterfly valve, a plate valve, a pressure activated valve, an air activated valve (e.g., an air injector) or any other suitable valve. In particular embodiments, each of the set of metering valves 1042a/b comprise a 2-state solenoid activated valve. The set of metering valves 1042a/b may be mounted on the manifold 1030 via a valve retention collar 1066a/b, for example using screws, bolts, rivets, etc. In some embodiments, a compliance member (e.g., a Belleville spring, a helical spring, a coil spring, a rubber strip, a foam strip, etc.) may be positioned between the valve retention collars 1066a/b and the manifold 1030. The compliance member may be configured to allow cantilevered motion of the valve retention collar 1066a/b so as to allow the set of metering valves 1042a/b to move axially relative to the manifold 1030, for example to accommodate expansion or contraction of the metering assemblies 1040a/b due to temperature changes, or expansion of the reductant due to freezing at low ambient temperatures. Furthermore, each of the set of metering valves 1042a/b may include a nozzle or orifice configured to provide the reductant at a predetermine pressure and flow rate corresponding to the activated metering valve 1042a/b.

The first metering assembly 1040a comprises a first reductant outlet 1046a positioned within the manifold 1030, and leading out of the manifold 1030 through the first sidewall 1031. Furthermore, the second metering assembly 1040b comprises a second reductant outlet 1046b also positioned within the manifold 1030, and leading out thereof through the first sidewall 1031. The positioning of each of the pump inlet 1032, the reductant return outlet 1038, and the reductant outlets 1046a/b through the first sidewall 1031 allows all fluid couplings to be positioned on one side of the reductant insertion assembly 1020, which may reduce space claim, or otherwise the space occupied by the reductant insertion assembly 1020. Furthermore, each of the metering assemblies 1040a/b may include a first coupler 1039a/b configured to receive a first pressure sensor for measuring a reductant inlet pressure. The metering assemblies 1040a/b also include a second coupler 1047a/b configured to receive a second pressure sensor for measuring a pressure of the reductant delivered to the first insertion unit and the second insertion unit, respectively.

Thus, the first pump assembly 1021a and the first metering assembly 1040a may be configured to provide the reductant with high precision to the first insertion unit, and the second pump assembly 1021b and the second metering assembly 1040b may be configured to provide the reductant with high precision to the second insertion unit independent of each other. In other embodiments, the reductant insertion assembly 1020 may include only the first pump assembly 1021a (or only the second pump assembly 1021b). The first metering assembly 1040a may be fluidly coupled to the first pump 1022a, and the second metering assembly 1040b may be fluidly coupled to the first metering assembly 1040a in series with the first pump 1022a. In such embodiments, the reductant insertion assembly may include the manifold 1030, and various components of the first pump assembly 1021a, and the metering assemblies 1040a/b may be positioned within the manifold 1030. The metering assemblies 1040a/b may be used, for example to deliver the reductant with low precision to the first insertion unit and the second insertion unit, respectively.

Figure 10:
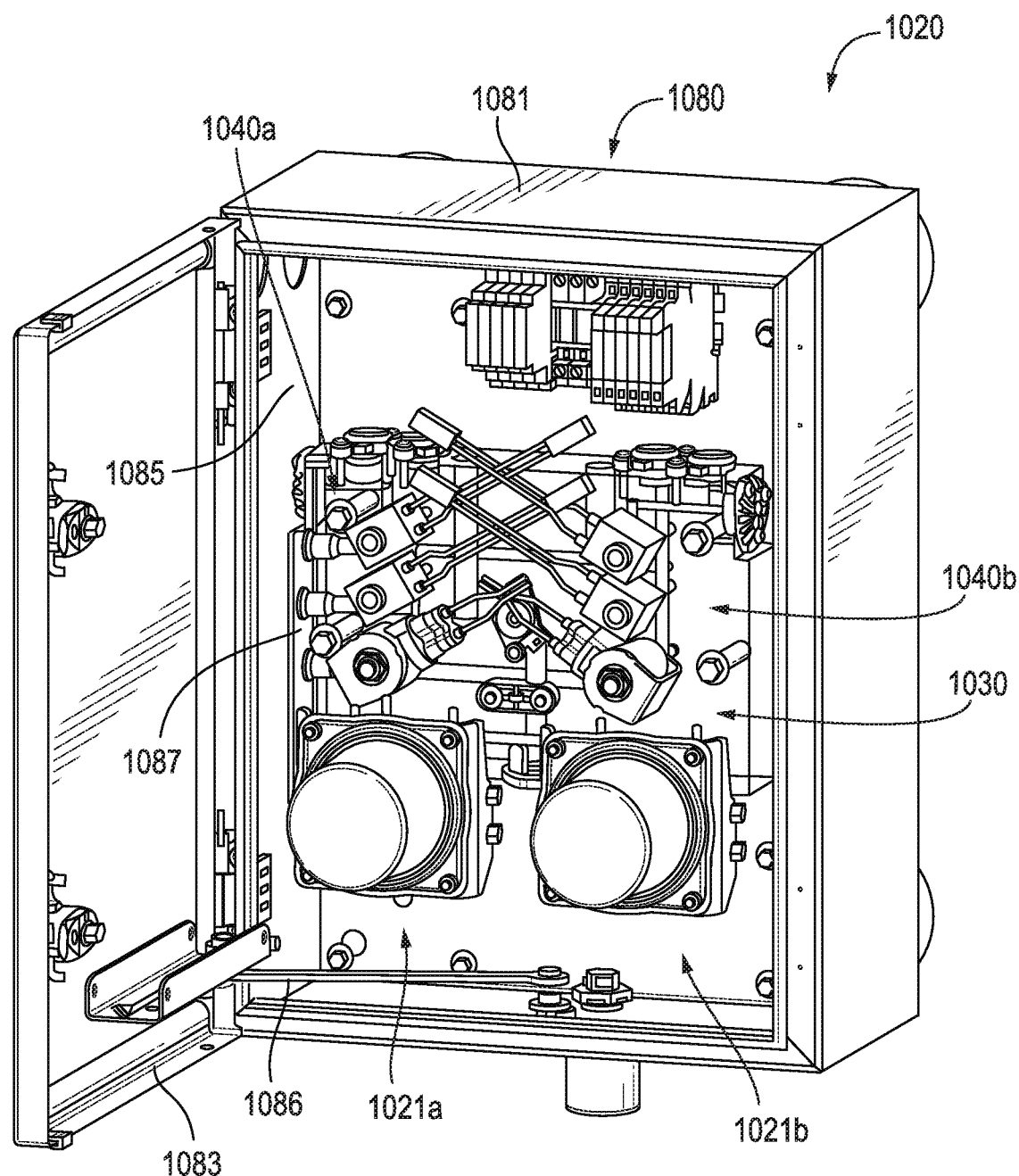
FIG. 10 is a front-right perspective view of the reductant insertion assembly of FIG. 9 positioned within an internal volume of an enclosure, according to a particular embodiment.
Figure 11:
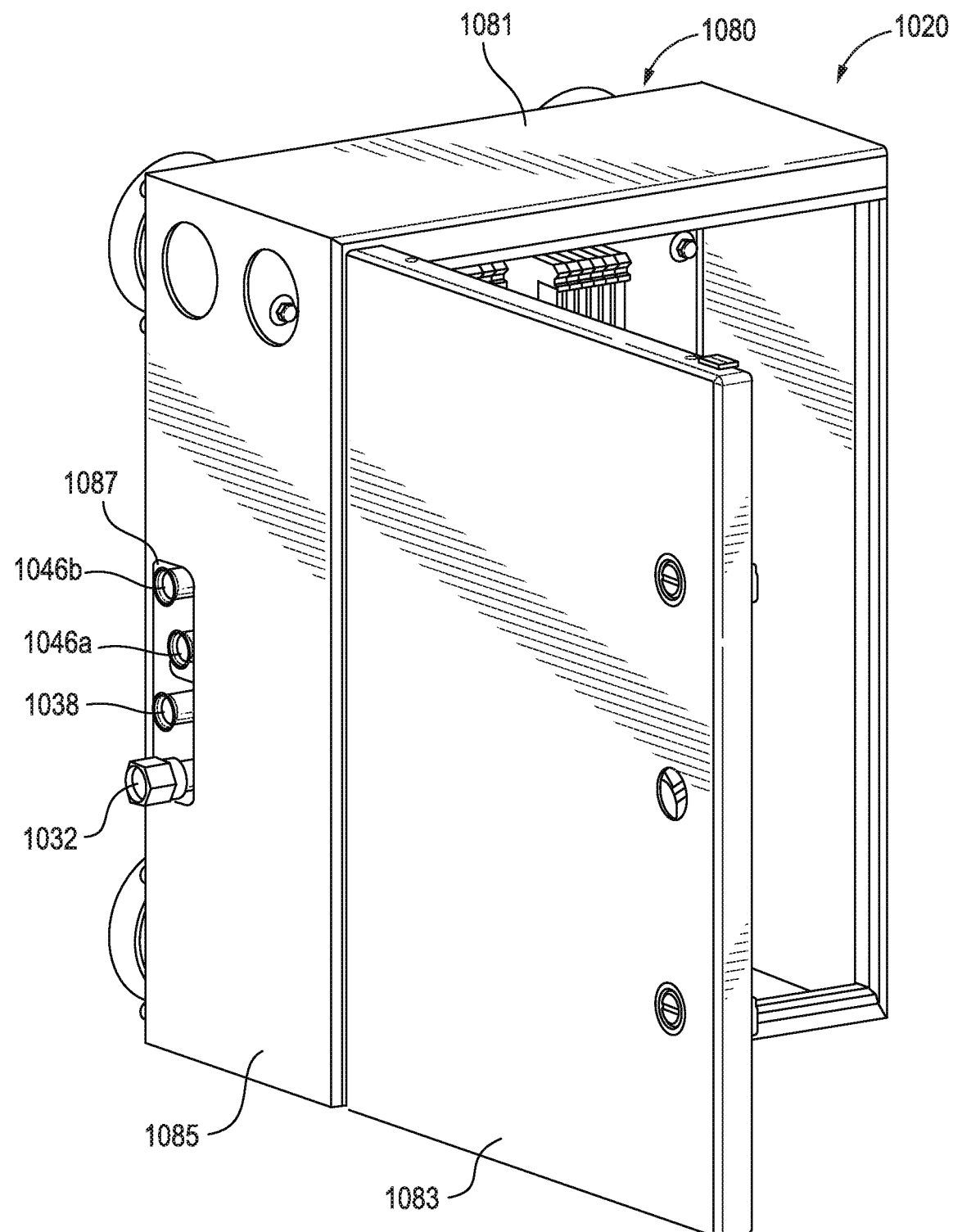
FIG. 11 is a front-left perspective view of the reductant insertion assembly of FIG. 10.

FIGS. 10 and 11 show perspective views of the reductant insertion assembly 1020 positioned within an internal volume of an enclosure 1080 of the reductant insertion assembly 1020. The enclosure 1080 includes a main body 1081 defining the internal volume, and a door 1083 coupled thereto. The door 1083 may be coupled to the main body 1081 via a hinge. A motion limiting arm 1086 is coupled to the main body 1081 and the door 1083, and is configured to limit the motion of the door 1083 relative to the main body 1081. A slot 1087 is defined in a sidewall 1085 of the main body 1081 positioned proximate to the first sidewall 1031 of the manifold 1030. The slot 1087 may be structured to allow positioning of each of the pump inlet 1032, the reductant return outlet 1038, and the reductant outlets 1046a/b therethrough so as to allow fluidic coupling with corresponding components.

Figure 12:
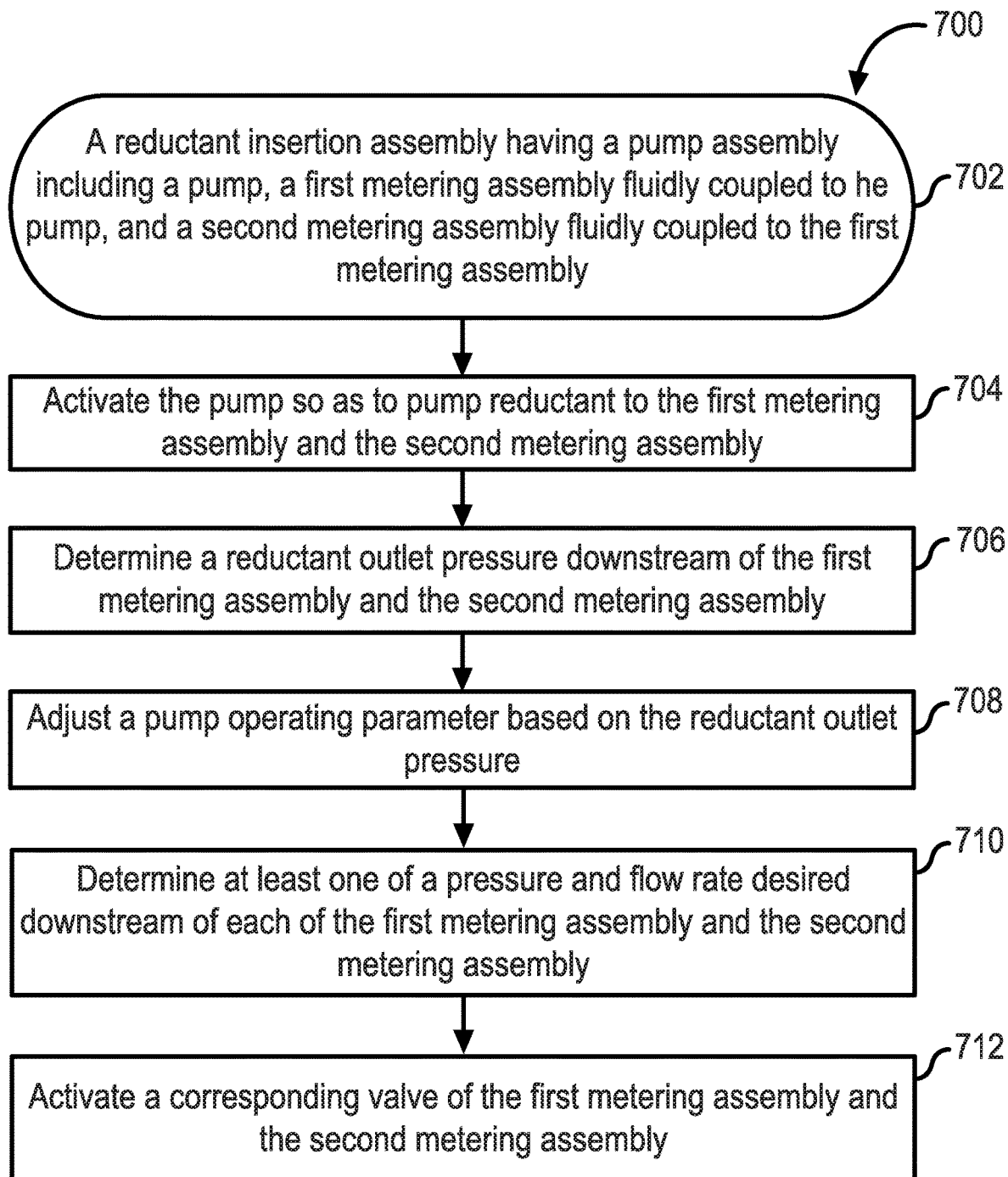
FIG. 12 is schematic flow diagram of a method for inserting a reductant at a plurality of locations in an aftertreatment system using a reductant insertion assembly that comprises a first metering assembly and a second metering assembly fluidly coupled to a single pump, according to an embodiment.

FIG. 12 is a schematic flow diagram of an example method 700 for inserting a reductant at a plurality of locations in an aftertreatment system (e.g., the aftertreatment system 100). While described with respect to the reductant insertion assembly 120, the operations of the method 700 may be used with any other reductant insertion assemblies described herein, for example the reductant insertion assembly 220, 320, 420, 520 or 620.

The method 700 includes providing a reductant insertion assembly comprising a pump assembly including a pump, a first metering assembly fluidly coupled to the pump, and a second metering assembly fluidly coupled to the first metering assembly in series with the pump, at 702. For example, the reductant insertion assembly may include the reductant insertion assembly 120 comprises the first metering assembly 140a fluidly coupled to the pump 122, and the second metering assembly 140b fluidly coupled to the first metering assembly 140a in series with the pump 122, as previously described herein.

At 704, the pump is activated so as to pump the reductant to the first metering assembly, and to the second metering assembly via the first metering assembly, such that a first reductant pressure in the first metering assembly is equal to a second reductant pressure in the second metering assembly. For example, the pump 122 is activated so as to pump the reductant to the first metering assembly 140a, and therethrough to the second metering assembly 140b such that a first reductant pressure in the first metering assembly 140a is equal to a second reductant pressure in the second metering assembly 140b.

At 706, a reductant outlet pressure is determined downstream of the first metering assembly and the second metering assembly. For example, the reductant outlet pressure sensors 147a/b may be positioned downstream of the metering assemblies 140a/b, or otherwise downstream of the set of first metering valves 142a/b and the set of second metering valves 142c/d, and a configured to determine the reductant outlet pressures downstream thereof.

At 708, a pump operating parameter of the pump is adjusted based on the reductant outlet pressure. For example, the controller 170 may adjust the pump operating parameter of the pump 122 (e.g., an rpm of the pump) based on the reductant outlet pressure measured by the reductant outlet pressure sensors 147a/b so as to provide the reductant to the first reductant outlet 146a and the second reductant outlet 146b at a corresponding predetermined reductant pressure and flow rate.

In some embodiments, the first metering assembly (e.g., the first metering assembly 140a) may comprise a set of first metering valves (e.g., the set of first metering valves 142a/b) and the second metering assembly (e.g., the second metering assembly 140b) may comprise a set of second metering valves (e.g., the set of second metering valves 142c/d). In such embodiments, the method 700 may include determining a target pressure and target flow rate of the reductant downstream of the first metering assembly and the second metering assembly, at 710. For example, the controller 170 may determine a target pressure and/or target flow rate of the reductant at the first insertion unit 156a and the second insertion unit 156b.

At 712, a first metering valve of the set of first metering valves, and a second metering valve of the set of second metering valves are activated such that the first metering valve and the second metering valve provide the reductant at the target pressure and target flow rate downstream of the first metering assembly and the second metering assembly. For example, the controller 170 may selectively activate one of the first metering valves 142a/b so as to deliver the reductant at the target pressure and target flow rate to the first insertion unit 156a. Similarly, the controller 170 may selectively activate one of the second metering valves 142c/d so as to deliver the reductant at the target pressure and target flow rate to the second insertion unit 156b. It should be appreciated that while operations 706-708, and operations 710-712 are shown in FIG. 12 as occurring in sequence, in other embodiments, operations 706-708 may be performed in the reverse order or simultaneously. Similarly, operations 706-708 may also be performed in the reverse order or simultaneously.

Figure 13:
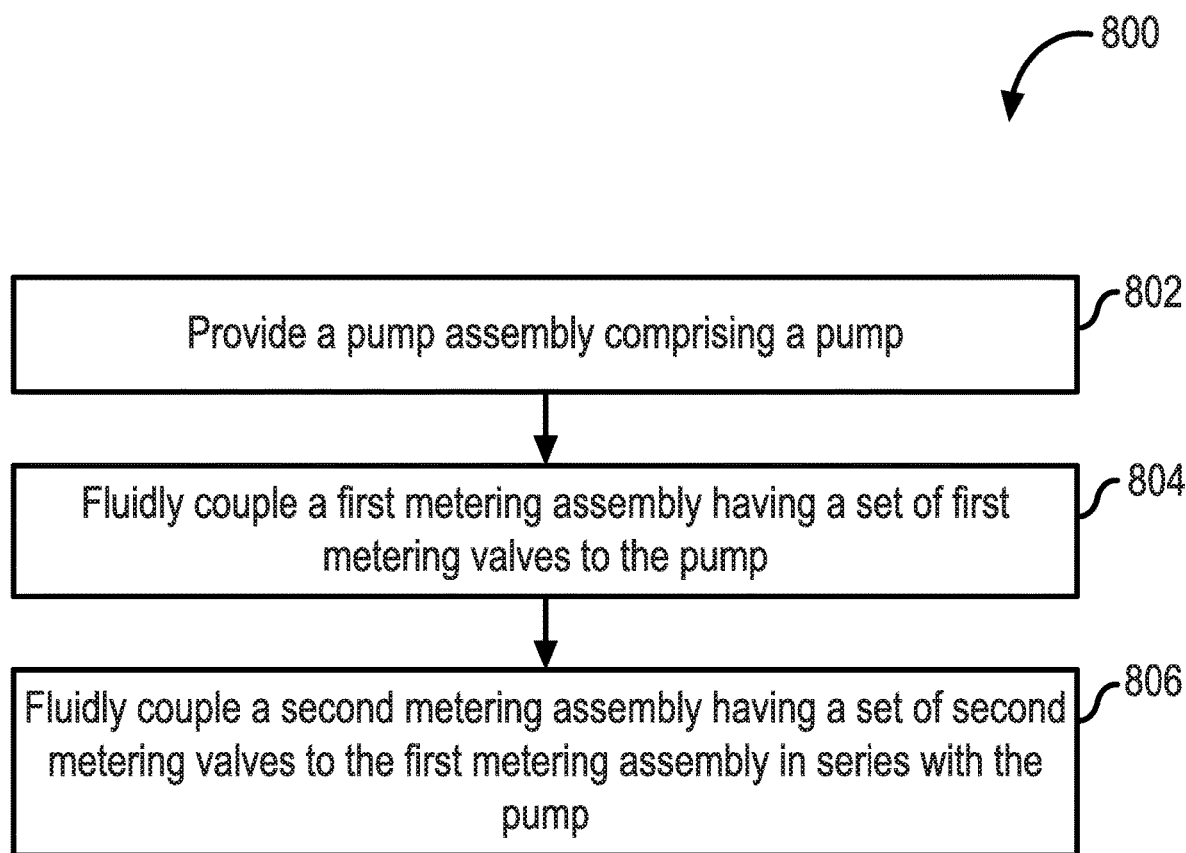
FIG. 13 is a schematic flow diagram of a method for providing a reductant insertion assembly for inserting a reductant at a plurality of locations in an aftertreatment system, according to another embodiment.

FIG. 13 is a schematic flow diagram of another example method 800 for assembling a reductant insertion assembly (e.g., the reductant insertion assembly 120, 220, 320, 420, 520 or 620) capable of providing a reductant to a plurality of locations in an SCR system (e.g., the SCR system 150) included in an aftertreatment system (e.g., the aftertreatment system 100). The method 800 includes providing a pump assembly comprising a pump, at 802. The pump assembly may include, for example the pump assembly 121, 221 comprising the pump 122, 222.

A first metering assembly comprising a set of first metering valves is fluidly coupled to the pump, at 804. For example, the first metering assembly 140a or a first metering assembly of the plurality of metering assemblies 240 is coupled to the pump 122, 222. A second metering assembly comprising a set of second metering valves is fluidly coupled to the first metering assembly in series with the pump, at 806. For example, the second metering assembly 140b or a second metering assembly of the plurality of metering assemblies 240 is fluidly coupled to the first metering assembly 140a, 240 in series with the pump 122, 222. The pump 122, 222 is be configured to pump reductant to each of the first metering assembly 140a, 240 and the second metering assembly 140b, 240 such that a reductant pressure in each of the first metering assembly 140a, 240 and the second metering assembly 140b, 240 is the same or about the same.

Figure 14:
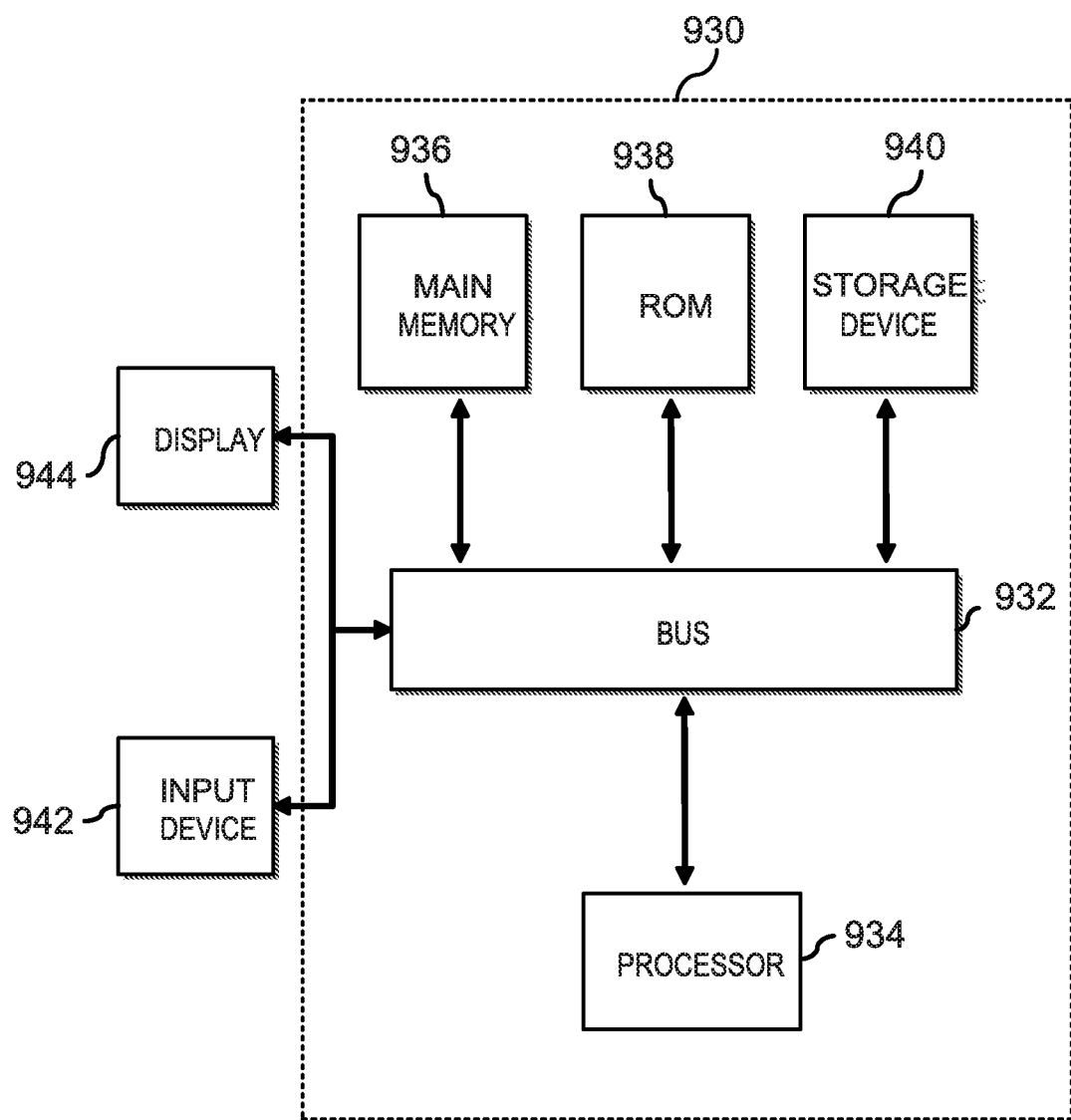
FIG. 14 is a schematic block diagram of an embodiment of a computing device which can be used as the controller included in the aftertreatment system of FIG. 1 or FIG. 2 or any other controller described herein.

In some embodiments, the controller 170, the control circuitry 171, the controllers 370a/b, 470, 570, 670a/b or any of the controllers described herein can be a system computer of an apparatus or system which includes the reductant insertion assembly 120, 220, 320, 420, 520 or 620 (e.g., a vehicle, an engine or generator set, etc.). For example, FIG. 14 is a block diagram of a computing device 930 in accordance with an illustrative implementation. The computing device 930 can be used to perform any of the methods or the processes described herein, for example the method 700. In some embodiments, the controller 170, the control circuitry 171, the controllers 370a/b, 470, 570 or 670a/b can include the computing device 930. The computing device 930 includes a bus 932 or other communication component for communicating information. The computing device 930 can also include one or more processors 934 or processing circuits coupled to the bus for processing information.

The computing device 930 also includes main memory 936, such as a random access memory (RAM) or other dynamic storage device, coupled to the bus 932 for storing information, and instructions to be executed by the processor 934. Main memory 936 can also be used for storing position information, temporary variables, or other intermediate information during execution of instructions by the processor 934. The computing device 930 may further include a read only memory (ROM) 938 or other static storage device coupled to the bus 932 for storing static information and instructions for the processor 934. A storage device 940, such as a solid-state device, magnetic disk or optical disk, is coupled to the bus 940 for persistently storing information and instructions.

The computing device 930 may be coupled via the bus 932 to a display 935, such as a liquid crystal display, or active matrix display, for displaying information to a user. An input device 942, such as a keyboard or alphanumeric pad, may be coupled to the bus 932 for communicating information and command selections to the processor 934. In another implementation, the input device 942 has a touch screen display 944.

According to various implementations, the processes and methods described herein can be implemented by the computing device 930 in response to the processor 934 executing an arrangement of instructions contained in main memory 936 (e.g., the operations of the method 700). Such instructions can be read into main memory 936 from another non-transitory computer-readable medium, such as the storage device 940. Execution of the arrangement of instructions contained in main memory 936 causes the computing device 930 to perform the illustrative processes described herein. One or more processors in a multi-processing arrangement may also be employed to execute the instructions contained in main memory 936. In alternative implementations, hard-wired circuitry may be used in place of or in combination with software instructions to effect illustrative implementations. Thus, implementations are not limited to any specific combination of hardware circuitry and software.

Although an example computing device has been described in FIG. 14, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As used herein, the term "about" generally mean plus or minus 10% of the stated value. For example, about 0.5 would include 0.45 and 0.55, about 10 would include 9 to 11, about 1000 would include 900 to 1100.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A reductant insertion assembly for inserting a reductant into an aftertreatment system, the reductant insertion assembly comprising:
   a pump assembly comprising a pump that includes a pump outlet;
   a first metering assembly fluidly coupled to the pump, the first metering assembly comprising a first metering manifold that comprises:
     a first reductant inlet fluidly coupled to the pump outlet,
     a first reductant outlet,
     a reductant transfer outlet, and
     a passage defined through the first metering manifold from the first reductant inlet to the reductant transfer outlet; and
   a second metering assembly fluidly coupled in series with the pump, the second metering assembly comprising a second metering manifold coupled to the first metering manifold, the second metering manifold comprising:
     a second reductant inlet fluidly coupled to the first reductant transfer outlet, and
     a second reductant outlet,
   wherein the second metering assembly is a separate structure from the first metering assembly and the second reductant inlet is removably coupled to the first reductant transfer outlet so as to be in fluid communication with the passage of the first metering assembly, and
   wherein the pump is configured to pump the reductant to the first metering assembly, and to the second metering assembly via the first metering assembly, such that a first reductant pressure in the first metering assembly is equal to a second reductant pressure in the second metering assembly.

2. The reductant insertion assembly of claim 1, wherein the pump comprises a fixed displacement gear pump.

3. The reductant insertion assembly of claim 1, wherein the first metering assembly comprises:
   a set of first metering valves mounted on the first metering manifold, each of the first metering valves being fluidly coupled to the first reductant outlet and configured to be selectively activated so as to communicate the reductant to the first reductant outlet at a predetermine pressure and flow rate corresponding to the activated first metering valve.

4. The reductant insertion assembly of claim 3, wherein the set of first metering valves comprise a plurality of first nozzles, each of the plurality of first nozzles corresponding to a respective one of the first metering valves and having a predetermined first nozzle diameter configured to provide the reductant to the first reductant outlet at the corresponding predetermined pressure and flow rate.

5. The reductant insertion assembly of claim 3, wherein the second metering assembly comprises:
   a set of second metering valves mounted on the second metering manifold, each of the second metering valves being fluidly coupled to the second reductant outlet and configured to be selectively activated so as to communicate the reductant to the second reductant outlet at a predetermined pressure and flow rate corresponding to the activated second metering valve.

6. The reductant insertion assembly of claim 5, wherein the set of second metering valves comprises a plurality of second nozzles, each of the plurality of second nozzles corresponding to a respective one of the second metering valve and having a predetermined second nozzle diameter configured to provide the reductant to the second reductant outlet at the corresponding predetermined pressure and flow rate.

7. The reductant insertion assembly of claim 1, further comprising:
   a plurality of reductant outlet pressure sensors including a first reductant outlet pressure sensor positioned downstream of the first metering assembly and the second metering assembly, and configured to measure a reductant outlet pressure of the reductant downstream of the first metering assembly and the second metering assembly,
   wherein the pump is configured to adjust a pumping pressure thereof based on the measured reductant outlet pressure downstream of the first metering assembly and the second metering assembly.

8. The reductant insertion assembly of claim 1, further comprising:
   an upstream pressure sensor positioned upstream of the pump and configured to measure an upstream reductant pressure.

9. The reductant insertion assembly of claim 1, further comprising:
   a downstream pressure sensor positioned downstream of the pump and upstream of the first metering assembly, the downstream pressure sensor configured to measure a downstream reductant pressure,
   wherein the pump is configured to adjust a pumping pressure thereof based on the measured downstream reductant pressure so as to provide the reductant to the first metering assembly and the second metering assembly at the first reductant pressure and the second reductant pressure, respectively.

10. An aftertreatment system configured to decompose constituents of an exhaust gas produced by an engine, the aftertreatment system comprising:
a selective catalytic reduction (SCR) system comprising a catalyst; and
a reductant insertion assembly fluidly coupled to the SCR system, the reductant insertion assembly comprising:
a pump assembly comprising a pump that includes a pump outlet,
a first metering assembly fluidly coupled to the pump, and to the selective catalytic reduction system at a first location, the first metering assembly comprising a first metering manifold that comprises:
a first reductant inlet fluidly coupled to the pump outlet,
a first reductant outlet,
a reductant transfer outlet, and
a passage defined through the first metering manifold from the first reductant inlet to the reductant transfer outlet, and
a second metering assembly fluidly coupled in series with the pump, and to the selective catalytic reduction system at a second location, the second metering assembly comprising a second metering manifold coupled to the first metering manifold, the second metering manifold comprising:
a second reductant inlet fluidly coupled to the first reductant transfer outlet, and
a second reductant outlet,
wherein the second metering assembly is a separate structure from the first metering assembly and the second reductant inlet is removably coupled to the first reductant transfer outlet so as to be in fluid communication with the passage of the first metering assembly, and
wherein the pump is configured to pump the reductant to the first metering assembly, and to the second metering assembly via the first metering assembly, such that a first reductant pressure in the first metering assembly is equal to a second reductant pressure in the second metering assembly.

11. The aftertreatment system of claim 10, further comprising:
a controller communicatively coupled to the pump and the reductant insertion assembly, the controller configured to selectively activate the first metering assembly and the second metering assembly so as to communicate the reductant to the selective catalytic reduction system at the first location and the second location, respectively.

12. The aftertreatment system of claim 11, wherein the first metering assembly comprises:
a set of first metering valves mounted on the first metering manifold, each of the set of first metering valves fluidly coupled to the first reductant outlet,
wherein the controller is further configured to:
determine a target pressure and target flow rate of the reductant at the first reductant outlet, and
selectively activate a corresponding first metering valve of the set of first metering valves, the corresponding first metering valve being configured to provide the reductant to the first reductant outlet at the target pressure and target flow rate.

13. The aftertreatment system of claim 12, wherein the set of first metering valves comprise a plurality of first nozzles, each of the plurality of first nozzles corresponding to a first metering valve, each of the plurality of first nozzles having a first nozzle diameter configured to provide the reductant to the first reductant outlet at a predetermined pressure and flow rate corresponding to the first metering valve associated with the corresponding first nozzle.

14. The aftertreatment system of claim 12, wherein the second metering assembly comprises:
a set of second metering valves mounted on the second metering manifold, each of the set of second metering valves fluidly coupled to the second reductant outlet,
wherein the controller is further configured to:
determine a target pressure and target flow rate of the reductant at the second reductant outlet, and
selectively activate a corresponding second metering valve of the set of second metering valves, the corresponding second metering valve structured to provide the reductant to the second reductant outlet at the target pressure and target flow rate.

15. The aftertreatment system of claim 14, wherein the set of second metering valves comprises a plurality of second nozzles, each of the plurality of second nozzles corresponding to a second metering valve and having a predetermined second nozzle diameter configured to provide the reductant to the second reductant outlet at a predetermined pressure and flow rate corresponding to the second metering valve associated with the corresponding second nozzle.

16. The aftertreatment system of claim 12, further comprising:
a downstream pressure sensor positioned downstream of the pump and upstream of the first metering assembly, the downstream pressure sensor configured to measure a downstream reductant pressure of the reductant downstream of the pump,
wherein the controller is further configured to:
determine the downstream reductant pressure, and
adjust a pumping pressure of the pump based on the downstream reductant pressure so as to provide the reductant to the first metering assembly and the second metering assembly at the first reductant pressure and the second reductant pressure, respectively.

17. The aftertreatment system of claim 11, further comprising;
a plurality of reductant outlet pressure sensors, a corresponding reductant outlet pressure sensor of the plurality of reductant outlet pressure sensors positioned downstream of the first metering assembly and the second metering assembly, and configured to measure a reductant outlet pressure downstream of the first metering assembly and the second metering assembly, respectively,
wherein the controller is communicatively coupled to the plurality of reductant outlet pressure sensors, the controller further configured to:
determine the reductant outlet pressures downstream of the first metering assembly and the second metering assembly, and
adjust a pumping pressure of the pump based on the reductant outlet pressures so as to provide the reductant to the first reductant outlet and the second reductant outlet at a corresponding predetermined reductant pressure and flow rate.

18. A method for inserting a reductant at a plurality of locations in a selective catalytic reduction system of an aftertreatment system, the method comprising:
providing a reductant insertion assembly comprising:
a pump assembly comprising a pump that includes a pump outlet, a first metering assembly fluidly coupled to the pump, the first metering assembly comprising a first metering manifold that comprises:
- a first reductant inlet fluidly coupled to the pump outlet,
- a first reductant outlet,
- a reductant transfer outlet, and
- a passage defined through the first metering manifold from the first reductant inlet to the reductant transfer outlet, and a second metering assembly fluidly coupled in series with the pump, the second metering assembly comprising a second metering manifold coupled to the first metering manifold, the second metering manifold comprising:
- a second reductant inlet fluidly coupled to the first reductant transfer outlet, and
- a second reductant outlet,
- wherein the second metering assembly is a separate structure from the first metering assembly and the second reductant inlet is removably coupled to the first reductant transfer outlet so as to be in fluid communication with the passage of the first metering assembly;

activating the pump so as to pump the reductant to the first metering assembly, and to the second metering assembly via the first metering assembly, such that a first reductant pressure in the first metering assembly is equal to a second reductant pressure in the second metering assembly;

determining a reductant outlet pressure downstream of the first metering assembly and the second metering assembly; and adjusting a pump operating parameter of the pump based on the reductant outlet pressure.

19. The method of claim 18, wherein the first metering assembly comprises a set of first metering valves mounted on the first metering manifold, and the second metering assembly comprises a set of second metering valves mounted on the second metering manifold, the method further comprising:

determining a target pressure and target flow rate of the reductant downstream of the first metering assembly and the second metering assembly; and activating a first metering valve of the set of first metering valves, and a second metering valve of the set of second metering valves, the first metering valve and the second metering valve providing the reductant at the target pressure and target flow rate downstream of the first metering assembly and the second metering assembly, respectively.

* * * * *